United States Patent
Yu et al.

(10) Patent No.: US 12,323,346 B2
(45) Date of Patent: Jun. 3, 2025

(54) RESOURCE ALLOCATION INDICATION METHOD AND APPARATUS

(71) Applicant: Huawei Technologies Co., Ltd., Shenzhen (CN)

(72) Inventors: Jian Yu, Shenzhen (CN); Oded Redlich, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/455,470

(22) Filed: Nov. 18, 2021

(65) Prior Publication Data

US 2022/0077979 A1    Mar. 10, 2022

Related U.S. Application Data

(63) Continuation of application No. PCT/CN2020/080169, filed on Mar. 19, 2020.

(30) Foreign Application Priority Data

May 20, 2019 (CN) .......................... 201910420499.4

(51) Int. Cl.
*H04L 5/00* (2006.01)
*H04W 72/044* (2023.01)
*H04W 72/563* (2023.01)
*H04W 84/12* (2009.01)

(52) U.S. Cl.
CPC .......... *H04L 5/0044* (2013.01); *H04L 5/0092* (2013.01); *H04W 72/044* (2013.01); *H04W 72/563* (2023.01); *H04W 84/12* (2013.01)

(58) Field of Classification Search
CPC ... H04L 5/0007; H04L 5/0044; H04L 5/0053; H04L 5/0092; H04L 5/0094; H04W 48/12; H04W 72/044; H04W 72/0453; H04W 72/23; H04W 72/563; H04W 84/12

See application file for complete search history.

(56) References Cited

U.S. PATENT DOCUMENTS

| 9,271,154 | B2 * | 2/2016 | Park | H04W 24/08 |
| 9,655,112 | B2 * | 5/2017 | Ghosh | H04W 72/0446 |
| 9,912,976 | B1 * | 3/2018 | Mader | G06Q 40/03 |
| 10,063,362 | B2 * | 8/2018 | Yang | H04W 28/065 |
| 10,206,218 | B2 * | 2/2019 | Wang | H04W 72/542 |
| 10,219,271 | B1 * | 2/2019 | Hedayat | H04L 5/0055 |

(Continued)

FOREIGN PATENT DOCUMENTS

CN    109600205 A    4/2019

OTHER PUBLICATIONS

U.S. Appl. No. 62/831,596 (Year: 2019).*

(Continued)

*Primary Examiner* — Dung B Huynh
(74) *Attorney, Agent, or Firm* — Slater Matsil, LLP

(57) ABSTRACT

In a method, a PPDU is generated, where the PPDU includes resource allocation information, and the resource allocation information is related to a channel bitmap in a beacon frame; and the PPDU is sent. According to the resource allocation indication method and apparatus provided in the embodiments of this application, an unavailable channel is indicated through an indication of the PPDU, so that a receive end can be prevent from performing transmission on the unavailable channel.

20 Claims, 19 Drawing Sheets

(56) References Cited

U.S. PATENT DOCUMENTS

| | | | | |
|---|---|---|---|---|
| 10,264,107 | B2* | 4/2019 | Yu | H04L 27/2634 |
| 10,749,625 | B2* | 8/2020 | Motozuka | H04L 1/0039 |
| 11,382,101 | B1* | 7/2022 | Chu | H04L 5/001 |
| 11,956,080 | B2* | 4/2024 | Jang | H04L 5/0007 |
| 12,052,651 | B2* | 7/2024 | Cherian | H04W 48/10 |
| 2005/0063334 | A1* | 3/2005 | Fnu | H04W 48/16 370/329 |
| 2006/0104296 | A1* | 5/2006 | Rodrigo | H04L 45/44 370/403 |
| 2008/0159249 | A1* | 7/2008 | Takahashi | H04L 5/0062 370/343 |
| 2008/0233907 | A1* | 9/2008 | Ibrahim | H03L 7/085 455/183.2 |
| 2009/0060081 | A1* | 3/2009 | Zhang | H04L 5/0051 375/267 |
| 2009/0207800 | A1* | 8/2009 | Shan | H04W 72/00 370/344 |
| 2010/0069013 | A1* | 3/2010 | Chaudhri | H04W 16/14 455/67.11 |
| 2011/0009060 | A1* | 1/2011 | Hsu | H04B 17/318 455/41.2 |
| 2011/0179126 | A1* | 7/2011 | Wetherell | H04W 24/10 709/206 |
| 2011/0235576 | A1* | 9/2011 | Gong | H04W 74/0816 370/328 |
| 2011/0249631 | A1* | 10/2011 | Li | H04W 72/02 370/329 |
| 2012/0026970 | A1* | 2/2012 | Winters | H04B 7/0632 370/329 |
| 2012/0170534 | A1* | 7/2012 | Kim | H04H 20/42 370/329 |
| 2012/0329413 | A1* | 12/2012 | Park | H04H 60/41 455/161.1 |
| 2013/0023214 | A1* | 1/2013 | Wang | A61B 5/0002 455/41.2 |
| 2013/0070703 | A1* | 3/2013 | Yasukawa | H04W 72/20 370/329 |
| 2013/0195036 | A1* | 8/2013 | Quan | H04W 72/542 370/329 |
| 2014/0086200 | A1* | 3/2014 | Seok | H04L 5/0096 370/330 |
| 2014/0126503 | A1* | 5/2014 | Kim | H04W 72/0453 370/329 |
| 2014/0185605 | A1* | 7/2014 | Oh | H04W 48/16 370/338 |
| 2015/0117364 | A1* | 4/2015 | Asterjadhi | H04L 5/003 370/329 |
| 2015/0319747 | A1* | 11/2015 | Chu | H04L 27/2602 370/330 |
| 2015/0327265 | A1* | 11/2015 | Lee | H04W 72/541 370/315 |
| 2015/0351115 | A1* | 12/2015 | Jeon | H04W 48/16 455/450 |
| 2016/0080122 | A1* | 3/2016 | Oh | H04L 27/26025 370/330 |
| 2016/0081075 | A1* | 3/2016 | Kim | H04L 1/0026 370/329 |
| 2016/0119929 | A1* | 4/2016 | Shimomura | H04W 48/16 370/312 |
| 2016/0135199 | A1* | 5/2016 | Wang | H04W 72/542 455/450 |
| 2016/0165313 | A1* | 6/2016 | Garcia Navarro | H04N 21/25883 725/46 |
| 2016/0204960 | A1* | 7/2016 | Yu | H04B 7/0417 370/338 |
| 2016/0242195 | A1* | 8/2016 | Kwon | H04L 25/0204 |
| 2017/0034829 | A1* | 2/2017 | Yang | H04L 43/0894 |
| 2017/0078059 | A1* | 3/2017 | Sun | H04W 72/0453 |
| 2017/0135087 | A1* | 5/2017 | Kim | H04W 74/04 |
| 2017/0180881 | A1* | 6/2017 | Paludan-Muller | H04R 25/356 |
| 2017/0188376 | A1* | 6/2017 | Noh | H04W 52/42 |
| 2017/0208542 | A1* | 7/2017 | Kim | H04W 52/02 |
| 2017/0223693 | A1 | 8/2017 | Kim et al. | |
| 2017/0294992 | A1* | 10/2017 | Chu | H04L 27/2602 |
| 2017/0295588 | A1* | 10/2017 | Ahn | H04W 72/12 |
| 2017/0303242 | A1* | 10/2017 | Choi | H04W 72/04 |
| 2017/0303255 | A1* | 10/2017 | Morioka | H04W 72/20 |
| 2017/0303292 | A1* | 10/2017 | Ahn | H04W 74/08 |
| 2017/0339701 | A1* | 11/2017 | Choi | H04L 5/0037 |
| 2017/0366329 | A1* | 12/2017 | Cao | H04L 5/0098 |
| 2018/0020437 | A1* | 1/2018 | Cui | H04W 72/23 |
| 2018/0132288 | A1* | 5/2018 | Aguirre | H04L 5/0064 |
| 2018/0160429 | A1* | 6/2018 | Seok | H04L 1/0075 |
| 2018/0234267 | A1* | 8/2018 | Rootsey | H04W 64/003 |
| 2018/0302858 | A1* | 10/2018 | Son | H04L 5/0094 |
| 2018/0375632 | A1* | 12/2018 | Kim | H04B 7/0452 |
| 2019/0007180 | A1 | 1/2019 | Shi et al. | |
| 2019/0007973 | A1* | 1/2019 | Lou | H04W 74/006 |
| 2019/0044598 | A1* | 2/2019 | Talarico | H04L 5/001 |
| 2019/0052395 | A1* | 2/2019 | Motozuka | H04L 1/1614 |
| 2019/0069298 | A1* | 2/2019 | Chen | H04L 5/0007 |
| 2019/0082447 | A1* | 3/2019 | Harsha | H04W 72/542 |
| 2019/0082461 | A1* | 3/2019 | Guo | H04W 74/02 |
| 2019/0124556 | A1 | 4/2019 | Verma et al. | |
| 2019/0124693 | A1* | 4/2019 | Nguyen | H04W 74/0816 |
| 2019/0132724 | A1* | 5/2019 | Asterjadhi | H04W 8/005 |
| 2019/0141570 | A1 | 5/2019 | Verma et al. | |
| 2019/0200387 | A1* | 6/2019 | Chitrakar | H04W 48/12 |
| 2019/0238259 | A1* | 8/2019 | Huang | H04L 1/0005 |
| 2019/0246354 | A1* | 8/2019 | Huang | H04W 52/0229 |
| 2019/0253984 | A1* | 8/2019 | Cariou | H04W 52/36 |
| 2019/0260531 | A1* | 8/2019 | Chen | H04L 5/0041 |
| 2019/0261359 | A1 | 8/2019 | Wang et al. | |
| 2019/0261369 | A1* | 8/2019 | Verma | H04L 5/0048 |
| 2019/0268850 | A1* | 8/2019 | Kim | H04W 74/08 |
| 2019/0327740 | A1* | 10/2019 | Verma | H04L 5/008 |
| 2019/0334590 | A1* | 10/2019 | Son | H04B 7/0452 |
| 2019/0373586 | A1* | 12/2019 | Verma | H04W 72/51 |
| 2019/0380117 | A1* | 12/2019 | Verma | H04L 5/0007 |
| 2020/0015219 | A1* | 1/2020 | Asterjadhi | H04W 72/51 |
| 2020/0107393 | A1* | 4/2020 | Chu | H04L 1/0003 |
| 2020/0186316 | A1* | 6/2020 | Kim | H04L 5/0053 |
| 2020/0213862 | A1* | 7/2020 | Sevindik | H04W 72/541 |
| 2020/0214036 | A1* | 7/2020 | Min | H04W 28/0278 |
| 2020/0228380 | A1* | 7/2020 | Yang | H04L 5/0039 |
| 2020/0260488 | A1* | 8/2020 | Cherian | H04W 56/001 |
| 2020/0267741 | A1* | 8/2020 | Kwon | H04W 72/121 |
| 2020/0280399 | A1* | 9/2020 | Kim | H04L 1/1864 |
| 2020/0288439 | A1* | 9/2020 | Seok | H04L 1/0013 |
| 2020/0314810 | A1* | 10/2020 | Tsai | H04W 72/23 |
| 2020/0328925 | A1* | 10/2020 | Yu | H04L 27/2666 |
| 2021/0028897 | A1* | 1/2021 | Park | H04L 5/0094 |
| 2021/0029774 | A1* | 1/2021 | Lim | H04W 8/24 |
| 2021/0050962 | A1* | 2/2021 | Yu | H04L 5/0091 |
| 2021/0068182 | A1* | 3/2021 | He | H04W 76/15 |
| 2021/0136699 | A1* | 5/2021 | Scholand | H04W 4/40 |
| 2021/0144696 | A1* | 5/2021 | Cariou | H04B 7/0452 |
| 2021/0176643 | A1* | 6/2021 | Jang | H04W 16/10 |
| 2021/0242998 | A1* | 8/2021 | Park | H04L 5/0092 |
| 2021/0250125 | A1* | 8/2021 | Park | H04L 27/2603 |
| 2021/0307099 | A1* | 9/2021 | Ryu | H04W 76/15 |
| 2021/0328741 | A1* | 10/2021 | Jang | H04L 27/2666 |
| 2021/0368491 | A1* | 11/2021 | Song | H04W 72/20 |
| 2021/0409172 | A1* | 12/2021 | Chen | H04L 5/0007 |
| 2022/0029669 | A1* | 1/2022 | Son | H04L 5/0023 |
| 2022/0061051 | A1* | 2/2022 | Song | H04W 72/0453 |
| 2022/0077964 | A1* | 3/2022 | Wang | H04W 74/004 |
| 2022/0104257 | A1* | 3/2022 | Ryu | H04W 74/0866 |
| 2022/0110119 | A1* | 4/2022 | Song | H04W 72/0453 |
| 2022/0217797 | A1* | 7/2022 | Kim | H04W 76/15 |
| 2022/0345550 | A1* | 10/2022 | Josiam | H04L 65/40 |
| 2022/0408349 | A1* | 12/2022 | Kneckt | H04W 48/16 |
| 2023/0087908 | A1* | 3/2023 | Cariou | H04L 5/0044 370/338 |
| 2023/0094028 | A1* | 3/2023 | Cariou | H04W 72/20 370/329 |
| 2023/0247549 | A1* | 8/2023 | Patil | H04W 52/0216 370/311 |

(56) References Cited

U.S. PATENT DOCUMENTS

2024/0196341 A1* 6/2024 Cariou ................ H04W 52/346
2024/0275566 A1* 8/2024 Lin ....................... H04L 5/0053
2025/0024503 A1* 1/2025 Hu ...................... H04W 74/002

OTHER PUBLICATIONS

Selinis, I. et al., "The Race to 5G Era; LTE and Wi-Fi", IEEE Access, Oct. 25, 2018, 39 pages.
IEEE Computer Society, Part 11: Wireless LAN Medium Access Control (MAC) and Physical Layer (PHY) Specifications, IEEE Std 802.11™-2016, Approved Dec. 7, 2016, 3534 pages.
IEEE Computer Society, Part 11: Wireless LAN Medium Access Control (MAC) and Physical Layer (PHY) specifications; Amendment 4: Further Higher Data Rate Extension in the 2.4 GHz Band, IEEE Std 802.11g™-2003, Jun. 27, 2003, 78 pages.
IEEE Computer Society, Part 11: Wireless LAN Medium Access Control (MAC) and Physical Layer (PHY) Specifications, Amendment 5: Enhancements for Higher Throughput, IEEE Std 802.11n™-2009, Oct. 29, 2009, 536 pages.
IEEE Computer Society, Part 11: Wireless LAN Medium Access Control (MAC) and Physical Layer (PHY) Specifications; Amendment 4: Enhancements for Very High Throughput for Operation in Bands below 6 GHz, IEEE Std 802.11ac™-2013, Approved Dec. 11, 2013, 425 pages.
IEEE Computer Society et al.,"Part 11:Wireless LAN Medium Access Control (MAC) and Physical Layer (PHY) Specifications", IEEE P802.11ax™/D4.0, Feb. 2019, 746 pages.

* cited by examiner

| | Resource allocation information of the 1st 20M channel | Resource allocation information of the 3rd 20M channel | Resource allocation information of the 5th 20M channel | Resource allocation information of the 7th 20M channel | Resource allocation information of the 9th 20M channel | Resource allocation information of the 11th 20M channel | Resource allocation information of the 13th 20M channel | Resource allocation information of the 15th 20M channel | Center-26 tone RU indication | User information corresponding to the 1st, 3rd, 5th, 7th, 9th, 11th, 13th, and 15th 20M channels |
|---|---|---|---|---|---|---|---|---|---|---|
| CC1 | | | | | | | | | | |

| | Resource allocation information of the 2nd 20M channel | Resource allocation information of the 4th 20M channel | Resource allocation information of the 6th 20M channel | Resource allocation information of the 8th 20M channel | Resource allocation information of the 10th 20M channel | Resource allocation information of the 12th 20M channel | Resource allocation information of the 14th 20M channel | Resource allocation information of the 16th 20M channel | Center-26 tone RU indication | User information corresponding to the 2nd, 4th, 6th, 8th, 10th, 12th, 14th, and 16th 20M channels |
|---|---|---|---|---|---|---|---|---|---|---|
| CC2 | | | | | | | | | | |

FIG. 4

| CC 1 | Resource allocation information of the 1st 20M channel | Resource allocation information of the 3rd 20M channel | Resource allocation information of the 7th 20M channel | Resource allocation information of the 11th 20M channel | Center-26 tone RU indication | User information corresponding to the 1st, 3rd, 7th, and 11th 20M channels |
|---|---|---|---|---|---|---|
| CC 2 | Resource allocation information of the 4th 20M channel | Resource allocation information of the 6th 20M channel | Resource allocation information of the 14th 20M channel | Resource allocation information of the 16th 20M channel | Center-26 tone RU indication | User information corresponding to the 4th, 6th, 14th, and 16th 20M channels |

FIG. 5

| | | | | | |
|---|---|---|---|---|---|
| CC 1 | Resource allocation information of the 1st 20M channel | Resource allocation information of the 4th 20M channel | Resource allocation information of the 7th 20M channel | Resource allocation information of the 14th 20M channel | Center-26 tone RU indication | User information corresponding to the 1st, 4th, 7th, and 14th 20M channels |

| | | | | | |
|---|---|---|---|---|---|
| CC 2 | Resource allocation information of the 3rd 20M channel | Resource allocation information of the 6th 20M channel | Resource allocation information of the 11th 20M channel | Resource allocation information of the 16th 20M channel | Center-26 tone RU indication | User information corresponding to the 3rd, 6th, 11th, and 16th 20M channels |

FIG. 6

| HE MU | Legacy short training field L-STF | Legacy long training field L-LTF | Legacy signaling field L-SIG | Repeated legacy signaling field Repeated L-SIG (RL-SIG) | High efficient signaling field-A HE-SIG-A | High efficient signaling field-B HE-SIG-B | High efficient short training field HE-STF | High efficient long training field HE-LTF | Data Data | Packet extension PE |
|---|---|---|---|---|---|---|---|---|---|---|
| Quantity of symbols: | 2 | 2 | 1 | 1 | 2 | 1–M | 1 | 1–8 | 1–N | |

FIG. 10

| TB | Legacy short training field L-STF | Legacy long training field L-LTF | Legacy signaling field L-SIG | Repeated legacy signaling field Repeated L-SIG (RL-SIG) | High efficient signaling field-A HE-SIG-A | High efficient short training field HE-STF | High efficient long training field HE-LTF | Data Data | Packet extension PE |
|---|---|---|---|---|---|---|---|---|---|
| Quantity of symbols: | 2 | 2 | 1 | 1 | 2 | 1 | 1–8 | 1–N | |

FIG. 11

| | | | | | |
|---|---|---|---|---|---|
| CC 1 | RU allocation subfield for the 1st 242-tone RU | RU allocation subfield for the 3rd 242-tone RU | Center-26-tone RU indication | CRC+Tail | Per user fields on the 1st and 3rd 242-tone RUs |
| CC 2 | RU allocation subfield for the 2nd 242-tone RU | RU allocation subfield for the 4th 242-tone RU | Center-26-tone RU indication | CRC+Tail | Per user fields on the 2nd and 4th 242-tone RUs |
| CC 1 | RU allocation subfield for the 1st 242-tone RU | RU allocation subfield for the 3rd 242-tone RU | Center-26-tone RU indication | CRC+Tail | Per user fields on the 1st and 3rd 242-tone RUs |
| CC 2 | RU allocation subfield for the 2nd 242-tone RU | RU allocation subfield for the 4th 242-tone RU | Center-26-tone RU indication | CRC+Tail | Per user fields on the 2nd and 4th 242-tone RUs |

FIG. 22

| | | | | | | | |
|---|---|---|---|---|---|---|---|
| CC 1 | RU allocation subfield for the 1st 242-tone RU | RU allocation subfield for the 3rd 242-tone RU | RU allocation subfield for the 5th 242-tone RU | RU allocation subfield for the 7th 242-tone RU | 1st Center-26-tone RU indication | CRC+ Tail | Per user fields on the 1st, 3rd, 5th, and 7th 242-tone RUs |
| CC 2 | RU allocation subfield for the 2nd 242-tone RU | RU allocation subfield for the 4th 242-tone RU | RU allocation subfield for the 6th 242-tone RU | RU allocation subfield for the 8th 242-tone RU | 2nd Center-26-tone RU indication | CRC+ Tail | Per user fields on the 2nd, 4th, 6th, and 8th 242-tone RUs |
| CC 1 | RU allocation subfield for the 1st 242-tone RU | RU allocation subfield for the 3rd 242-tone RU | RU allocation subfield for the 5th 242-tone RU | RU allocation subfield for the 7th 242-tone RU | 1st Center-26-tone RU indication | CRC+ Tail | Per user fields on the 1st, 3rd, 5th, and 7th 242-tone RUs |
| CC 2 | RU allocation subfield for the 2nd 242-tone RU | RU allocation subfield for the 4th 242-tone RU | RU allocation subfield for the 6th 242-tone RU | RU allocation subfield for the 8th 242-tone RU | 2nd Center-26-tone RU indication | CRC+ Tail | Per user fields on the 2nd, 4th, 6th, and 8th 242-tone RUs |
| CC 1 | RU allocation subfield for the 1st 242-tone RU | RU allocation subfield for the 3rd 242-tone RU | RU allocation subfield for the 5th 242-tone RU | RU allocation subfield for the 7th 242-tone RU | 1st Center-26-tone RU indication | CRC+ Tail | Per user fields on the 1st, 3rd, 5th, and 7th 242-tone RUs |
| CC 2 | RU allocation subfield for the 2nd 242-tone RU | RU allocation subfield for the 4th 242-tone RU | RU allocation subfield for the 6th 242-tone RU | RU allocation subfield for the 8th 242-tone RU | 2nd Center-26-tone RU indication | CRC+ Tail | Per user fields on the 2nd, 4th, 6th, and 8th 242-tone RUs |
| CC 1 | RU allocation subfield for the 1st 242-tone RU | RU allocation subfield for the 3rd 242-tone RU | RU allocation subfield for the 5th 242-tone RU | RU allocation subfield for the 7th 242-tone RU | 1st Center-26-tone RU indication | CRC+ Tail | Per user fields on the 1st, 3rd, 5th, and 7th 242-tone RUs |
| CC 2 | RU allocation subfield for the 2nd 242-tone RU | RU allocation subfield for the 4th 242-tone RU | RU allocation subfield for the 6th 242-tone RU | RU allocation subfield for the 8th 242-tone RU | 2nd Center-26-tone RU indication | CRC+ Tail | Per user fields on the 2nd, 4th, 6th, and 8th 242-tone RUs |

FIG. 23

RESOURCE ALLOCATION INDICATION METHOD AND APPARATUS

CROSS-REFERENCE TO RELATED APPLICATIONS

This application is a continuation of International Application No. PCT/CN2020/080169, filed on Mar. 19, 2020, which claims priority to Chinese Patent Application No. 201910420499.4, filed on May 20, 2019. The disclosures of the aforementioned applications are hereby incorporated by reference in their entireties.

TECHNICAL FIELD

Embodiments of this application relate to the communications field, and in particular, to a resource allocation indication method and apparatus in the communications field.

BACKGROUND

In recent years, a quantity of WLAN wireless devices exponentially increases, and a requirement for a bandwidth of a WLAN wireless communications system is also increasingly high. In an evolution process from 802.11a to 802.11ax through 802.11 g, 802.11n, and 802.11ac, a bandwidth supported by the system has evolved from 20 M, 40 M, 80 M, and 160 M to a larger bandwidth.

Before 802.11ax, all PPDUs occupy consecutive channels. However, as a system bandwidth increases, some channels cannot be used in a period of time or specific time for the following several possible reasons:

For example, a radar signal exists. In an unlicensed spectrum, if a WLAN user discovers the radar signal, the WLAN user needs to actively avoid the radar signal.

For example, a licensed channel exists, and a WLAN user needs to actively avoid these licensed channels.

For a WLAN user, how to indicate resource unit allocation when an unavailable channel exists is an urgent problem to be resolved.

SUMMARY

According to a resource allocation indication method and apparatus provided in embodiments of this application, an unavailable channel is indicated through an indication of a PPDU, so that a receive end can be prevent from performing transmission on the unavailable channel. This prevents interference to a radar or an authorized user.

According to the resource allocation indication method and apparatus provided in the embodiments of this application, resource allocation information of the PPDU includes only resource allocation information of an available channel indicated by a channel bitmap in a beacon frame, and does not include resource allocation information of an unavailable channel indicated by the channel bitmap in the beacon frame. This reduces overheads of the PPDU.

According to the resource allocation indication method and apparatus provided in the embodiments of this application, available channels are re-ranked, so that resource allocation information on a content channel 1 and a content channel 2 becomes more even, and a bit may not be filled for alignment, thereby reducing overheads.

According to a first aspect, an embodiment of this application provides a resource allocation indication method, and the method includes: generating a PPDU, where the PPDU includes resource allocation information, and the resource allocation information is related to a channel bitmap in a beacon frame; and sending the PPDU.

In this embodiment of this application, an unavailable channel is indicated through an indication of the PPDU, so that a receive end can be prevent from performing transmission on the unavailable channel. This prevents interference to a radar or an authorized user.

In a possible implementation of the first aspect, resource allocation information of an unavailable channel indicated by the channel bitmap in the beacon frame indicates any one of the following: a null 242-tone resource unit, a 484-tone RU that is on an SIG-B content channel and whose resource unit allocation subfield includes zero user fields, or a 996-tone RU that is on the SIG-B content channel and whose resource unit allocation subfield includes zero user fields.

Further, the resource allocation information of the unavailable channel indicated by the channel bitmap in the beacon frame is any one of 01110001, 01110010, or 01110011, where 01110001 indicates "the null 242-tone resource unit", 01110010 indicates "a 484-tone RU that is on an EHT-SIG-B content channel and whose resource unit allocation subfield includes zero user fields", and 01110011 indicates "a 996-tone RU that is on the EHT-SIG-B content channel and whose resource unit allocation subfield includes zero user fields".

Further, user information corresponding to the resource allocation information of the unavailable channel indicated by the channel bitmap in the beacon frame does not exist.

In another possible implementation of the first aspect, the resource allocation information includes only resource allocation information of an available channel indicated by the channel bitmap in the beacon frame, and does not include resource allocation information of an unavailable channel indicated by the channel bitmap in the beacon frame.

Further, user information corresponding to the resource allocation information of the unavailable channel indicated by the channel bitmap in the beacon frame does not exist.

In a possible implementation of the first aspect, resource allocation information on a content channel 1 includes resource allocation information of an odd-numbered channel after re-ranking, resource allocation information on a content channel 2 includes resource allocation information of an even-numbered channel after re-ranking, and the re-ranking means re-ranking available channels indicated by the channel bitmap in the beacon frame.

Further, user information corresponding to the resource allocation information of the unavailable channel indicated by the channel bitmap in the beacon frame does not exist.

According to a second aspect, an embodiment of this application provides a resource allocation indication method, and the method includes: receiving a PPDU, where the PPDU includes resource allocation information, and the resource allocation information is related to a channel bitmap in a beacon frame; and transmitting, based on the received beacon frame and the PPDU, data on a resource unit indicated by the resource allocation information of the PPDU corresponding to user information of the PPDU.

In a possible implementation of the second aspect, resource allocation information of an unavailable channel indicated by the channel bitmap in the beacon frame indicates any one of the following: a null 242-tone resource unit, a 484-tone RU that is on an SIG-B content channel and whose resource unit allocation subfield includes zero user fields, or a 996-tone RU that is on the SIG-B content channel and whose resource unit allocation subfield includes zero user fields.

Further, the resource allocation information of the unavailable channel indicated by the channel bitmap in the beacon frame is any one of 01110001, 01110010, or 01110011, where 01110001 indicates "the null 242-tone resource unit", 01110010 indicates "a 484-tone RU that is on an EHT-SIG-B content channel and whose resource unit allocation subfield includes zero user fields", and 01110011 indicates "a 996-tone RU that is on the EHT-SIG-B content channel and whose resource unit allocation subfield includes zero user fields".

Further, user information corresponding to the resource allocation information of the unavailable channel indicated by the channel bitmap in the beacon frame does not exist.

In another possible implementation of the second aspect, the resource allocation information includes only resource allocation information of an available channel indicated by the channel bitmap in the beacon frame, and does not include resource allocation information of an unavailable channel indicated by the channel bitmap in the beacon frame.

Further, user information corresponding to the resource allocation information of the unavailable channel indicated by the channel bitmap in the beacon frame does not exist.

In a possible implementation of the second aspect, resource allocation information on a content channel 1 includes resource allocation information of an odd-numbered channel after re-ranking, resource allocation information on a content channel 2 includes resource allocation information of an even-numbered channel after re-ranking, and the re-ranking means re-ranking available channels indicated by the channel bitmap in the beacon frame.

Further, user information corresponding to the resource allocation information of the unavailable channel indicated by the channel bitmap in the beacon frame does not exist.

According to a third aspect, an embodiment of this application provides a resource allocation indication apparatus, and the indication apparatus includes a unit configured to perform the method according to any one of the first aspect or the possible implementations of the first aspect.

According to a fourth aspect, an embodiment of this application provides a resource allocation indication apparatus, and the indication apparatus includes a unit configured to perform the method according to any one of the second aspect or the possible implementations of the second aspect.

According to a fifth aspect, an embodiment of this application provides a resource allocation indication apparatus, including a processor and a transceiver that is in a communicative connection with an inner side of the processor. The processor is configured to generate a PPDU, where the PPDU includes resource allocation information, and the resource allocation information is related to a channel bitmap in a beacon frame. The transceiver is configured to send the PPDU.

The resource allocation indication apparatus provided in the fifth aspect is configured to perform the method according to any one of the first aspect or the possible implementations of the first aspect. For specific details, refer to any one of the first aspect or the possible implementations of the first aspect. Details are not described herein again.

According to a sixth aspect, an embodiment of this application provides a resource allocation indication apparatus, including a processor and a transceiver that is in a communicative connection with an inner side of the processor. The transceiver is configured to receive a PPDU, where the PPDU includes resource allocation information, and the resource allocation information is related to a channel bitmap in a beacon frame. The processor is configured to transmit, based on the received beacon frame and the PPDU, data on a resource unit indicated by the resource allocation information of the PPDU corresponding to user information of the PPDU.

The resource allocation indication apparatus provided in the sixth aspect is configured to perform the method according to any one of the second aspect or the possible implementations of the second aspect. For specific details, refer to any one of the second aspect or the possible implementations of the second aspect. Details are not described herein again.

According to a seventh aspect, an embodiment of this application provides a resource allocation indication apparatus, and the indication apparatus includes a processing circuit and an output interface that is in a communicative connection with an inner side of the processing circuit. The processing circuit is configured to generate a PPDU, where the PPDU includes resource allocation information, and the resource allocation information is related to a channel bitmap in a beacon frame. The output interface is configured to send the PPDU.

The resource allocation indication apparatus provided in the seventh aspect is configured to perform the method according to any one of the first aspect or the possible implementations of the first aspect. For specific details, refer to any one of the first aspect or the possible implementations of the first aspect. Details are not described herein again.

According to an eighth aspect, an embodiment of this application provides a resource allocation indication apparatus, and the indication apparatus includes a processing circuit and an input interface that is in a communicative connection with an inner side of the processing circuit. The input interface is configured to receive a PPDU, where the PPDU includes resource allocation information, and the resource allocation information is related to a channel bitmap in a beacon frame. The processing circuit is configured to transmit, based on the received beacon frame and the PPDU, data on a resource unit indicated by the resource allocation information of the PPDU corresponding to user information of the PPDU.

The resource allocation indication apparatus provided in the eighth aspect is configured to perform any one of the second aspect or the possible implementations of the second aspect. For specific details, refer to any one of the second aspect or the possible implementations of the second aspect. Details are not described herein again.

According to a ninth aspect, an embodiment of this application provides a computer-readable storage medium, configured to store a computer program. The computer program includes instructions used to perform the method according to any one of the first aspect or the possible implementations of the first aspect.

According to a tenth aspect, an embodiment of this application provides a computer-readable storage medium, configured to store a computer program. The computer program includes instructions used to perform the method according to any one of the second aspect or the possible implementations of the second aspect.

According to an eleventh aspect, an embodiment of this application provides a computer program, and the computer program includes instructions used to perform the method according to any one of the first aspect or the possible implementations of the first aspect.

According to a twelfth aspect, an embodiment of this application provides a computer program, and the computer program includes instructions used to perform the method according to any one of the second aspect or the possible implementations of the second aspect.

According to a thirteenth aspect, an embodiment of this application provides a communications system, and the communications system includes the resource allocation indication apparatus provided in the third aspect, the fifth aspect, or the seventh aspect, and the resource allocation indication apparatus provided in the fourth aspect, the sixth aspect, or the eighth aspect.

BRIEF DESCRIPTION OF THE DRAWINGS

FIG. 4 shows a structure of a content channel of a PPDU;

FIG. 5 shows a content channel in a second embodiment;

FIG. 6 shows a content channel in a third embodiment;

FIG. 10 shows a format of a DL PPDU;

FIG. 11 shows a data packet structure of an HE TB PPDU;

FIG. 22 shows that two HE-SIG-B content channels exist when a bandwidth of a PPDU is 80 MHz; and FIG. 23 shows that two HE-SIG-B content channels exist when a bandwidth of a PPDU is 160 MHz.

DETAILED DESCRIPTION OF ILLUSTRATIVE EMBODIMENTS

The following describes the technical solutions in embodiments of this application with reference to the accompanying drawings in the embodiments of this application.

It should be understood that, the technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a worldwide interoperability for microwave access (WiMAX) communications system, another future evolved system, another various wireless communication system that adopts a radio access technology, and the like.

Figure 1:
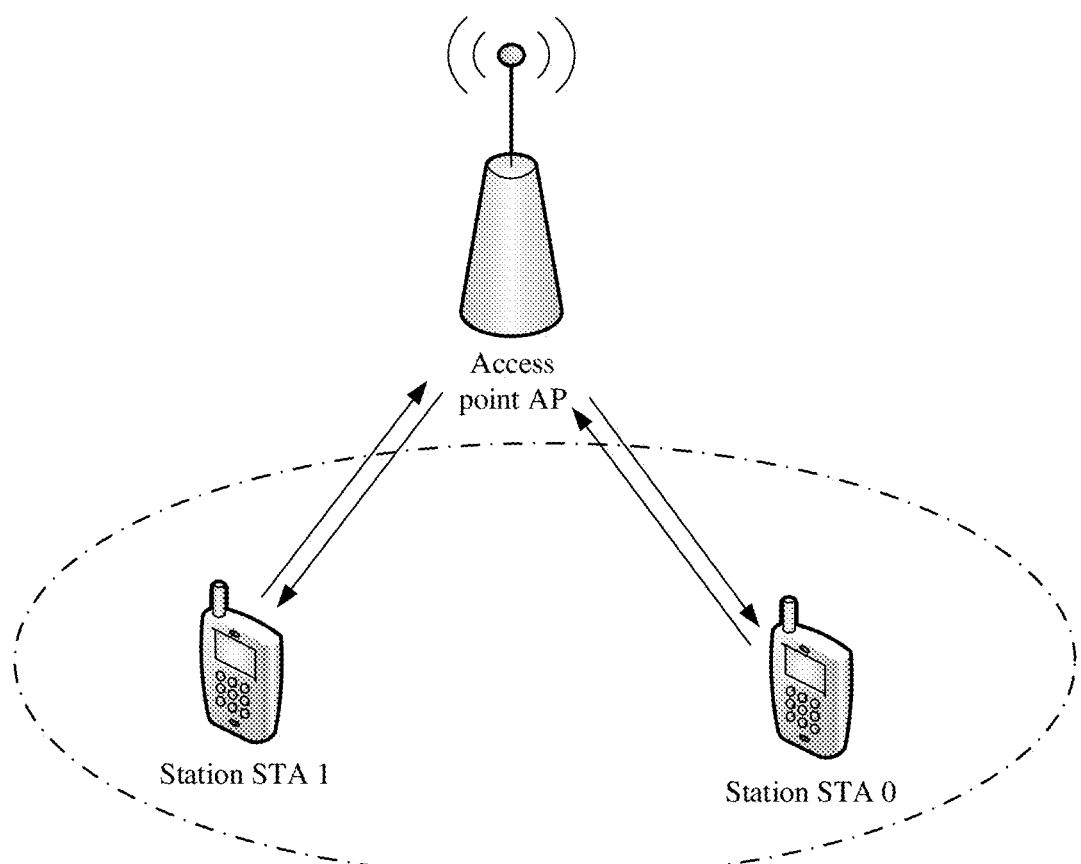
FIG. 1 shows a communications system to which an embodiment of this application is applied.

FIG. 1 shows a communications system to which an embodiment of this application is applied. The communications system includes a network device and at least one terminal device located in coverage of the network device. The network device can provide communication coverage for a specific geographical area, and can communicate with a terminal device located in the coverage area. The network device may be a base transceiver station (BTS) in a GSM system or a code division multiple access (CDMA) system, may be a NodeB (NB) in a WCDMA system, may be an evolved NodeB (eNB or eNodeB) in an LTE system, may be a radio controller in a cloud radio access network (CRAN), or may be a relay station, an access point AP, a vehicle-mounted device, a wearable device, a network side device in a future network, or the like. The terminal device may be movable or fixed. The terminal device may be a station STA, an access terminal, user equipment (UE), a user unit, a user station, a mobile station, a mobile console, a remote station, a remote terminal, a mobile device, a user terminal, a wireless communications device, a user agent, a user apparatus, or the like.

Embodiments of this application specifically relate to a resource allocation indication method and apparatus. The embodiments of this application relate to how to design resource allocation information of a PPDU when an unavailable channel exists, to reduce overheads generated by the resource allocation information.

An unavailable channel in the embodiments of this application may be further described as a punctured channel, a channel on which transmission is not allowed, or the like.

A physical-layer protocol data unit (PPDU) in the embodiments of this application may be further described as a data packet or the like.

A related technology in the embodiments of this application is first described below.

(I) Channel

A Wireless Local Area Network (WLAN) starts from 802.11a/g, undergoes 802.11n and 802.11ac, and comes to 802.11ax that is currently discussed. A bandwidth supported by a PPDU in the WLAN is shown in the following table:

TABLE 1

| | Maximum allowed transmission bandwidth | | | |
|---|---|---|---|---|
| | 802.11a/g (non-HT) | 802.11n (HT) | 802.11ac (VHT) | 802.11ax (HE) |
| Bandwidth | 20 MHz | 20 MHz and 40 MHz | 20 MHz, 40 MHz, 80 MHz, and 160 MHz/80 + 80 MHz | 20 MHz, 40 MHz, 80 MHz, and 160 MHz/80 + 80 MHz |

A name of the 802.11n standard is high throughput (HT), a name of the 802.11ac standard is very high throughput (VHT), a name of the 802.11ax standard is HE high efficient (HE), and standards before HT, such as 802.11a/g, are collectively referred to as non-high throughput (non-HT).

Figure 9:
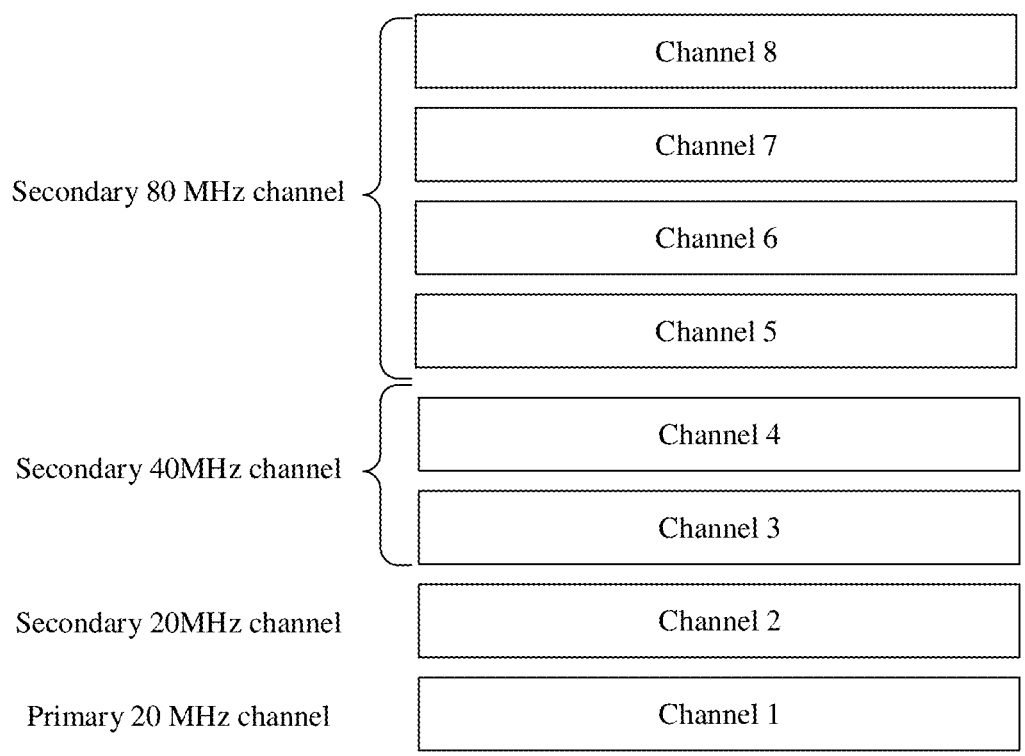
FIG. 9 shows an example of channel allocation in 802.11.

The 802.11 standard usually uses 20 MHz as a basic bandwidth, and supports a bandwidth that is an exponential integer multiple of 20 MHZ (20 MHz, 40 MHZ, 80 MHZ, or 160 MHz). For channel allocation, an example of channel allocation in 802.11 is shown in FIG. 9. Channels are numbered in ascending order of absolute frequencies, that is, from a channel 1 to a channel 8.

An entire channel is divided into a primary 20 MHz channel (or referred to as a primary channel for short, or primary 20 MHz, P20 for short), a secondary 20 MHz channel (Secondary 20 MHz, S20), a secondary 40 MHz channel (S40), and a secondary 80 MHz (S80) channel.

Before 11ax, all PPDUs occupy consecutive channels. However, some channels cannot be used in a period of time or specific time for the following several possible reasons:

A radar signal exists. In an unlicensed spectrum, if a WLAN user discovers the radar signal, the WLAN user needs to actively avoid the radar signal.

An authorized user exists. An authorized user may exist on some specific channels. If a WLAN user discovers the authorized user, the WLAN user needs to actively avoid the authorized user.

Interference from another user exists.

When an unavailable channel exists, how to indicate resource allocation of an available channel is a problem to be resolved in this application.

(II) OFDMA Transmission

Before the 802.11ax standard, the 802.11 standard supports only orthogonal frequency division multiplexing (OFDM) transmission, and an entire bandwidth is uniformly allocated to one station or a group of stations (STA) for single user (SU) transmission or downlink multiple user multiple input multiple output (DL MU MIMO) transmission. However, in 802.11ax, an orthogonal frequency division multiple access (OFDMA) technology is newly introduced, and an entire bandwidth is divided into one or more resource units (RU). DL OFDMA and uplink (UL) OFDMA are introduced into 802.11ax, and 802.11ax has four packet formats in total. An HE MU Physical Protocol Data Unit (PPDU) which may also be simply referred to as a data packet) is configured to perform DL OFDMA and DL MU MIMO transmission. A PPDU format of the HE MU PPDU is shown in FIG. 10.

The entire PPDU is divided into a preamble part and a data field part. The preamble part includes two HE signaling fields: a high efficient signaling field-A (HE-SIG-A) and an HE-SIG-B. The HE-SIG-A is used to indicate a bandwidth of a data packet, a quantity of symbols included in the HE-SIG-B, a modulation and coding scheme (MCS) used by the HE-SIG-B, whether the HE-SIG-B uses a compression mode, and another indication. The HE-SIG-B mainly includes a common field and a per user field. The common field includes specific resource unit allocation of an entire bandwidth, and the per user field includes an association identifier (AID) of each user, an MCS, a number of spatial and time streams (NSTS), a coding manner, whether a transmit beamforming is used, and the like.

For UL OFDMA, an AP access point (AP) first sends a trigger frame to a plurality of STAs. The trigger frame is a type of control frame in a Medium Access Control (MAC) frame, and is used to trigger a plurality of users to perform uplink multi-user transmission. The trigger frame includes resource indication information required for uplink OFDMA transmission, including a station identifier, resource unit allocation information, and the like; and provides, for the plurality of STAs, reference for power, time, and frequency synchronization.

After receiving the trigger frame, the plurality of STAs send an HE Trigger Based (TB) PPDU to the AP to perform UL OFDMA transmission. A data packet structure of the HE TB PPDU is shown in FIG. 11. The resource indication information for UL OFDMA transmission is located in the trigger frame, and therefore does not need to be indicated in the HE TB PPDU by using the HE-SIG-B.

(III) Channel Puncturing

Figure 12:
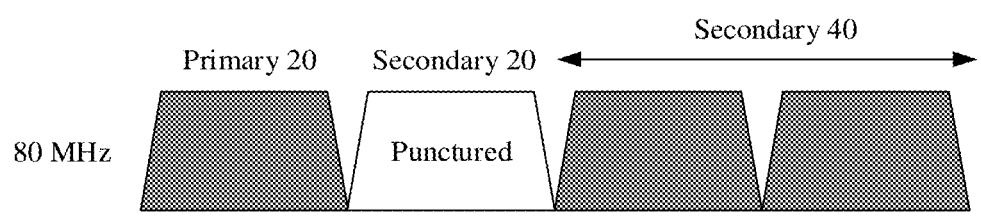
FIG. 12 shows an 80 MHz preamble puncturing (PP) mode in which only a secondary 20 M channel (Secondary 20) is punctured.
Figure 13:
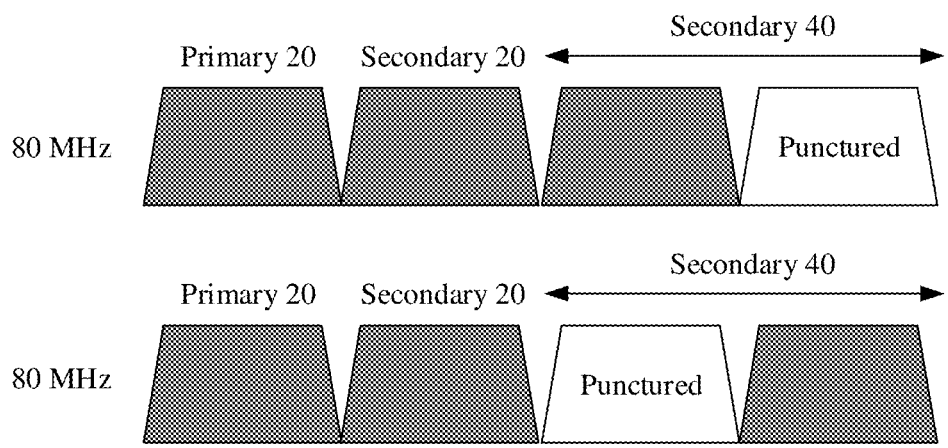
FIG. 13 shows an 80 MHz preamble puncturing (PP) mode in which only one of two 20 MHz in S40 is punctured.
Figure 14:
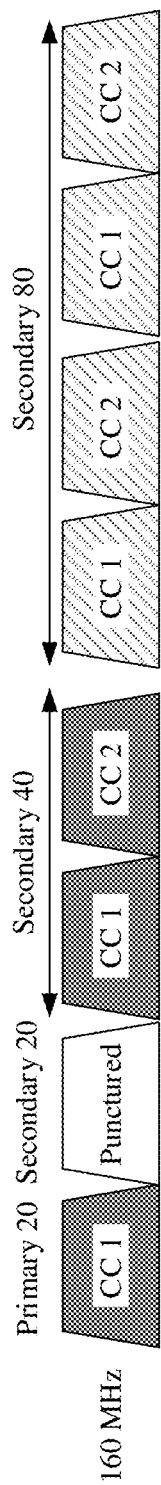
FIG. 14 shows a 160 MHz/80+80 MHz (PP) mode in which only one of two 20 MHz in S40 is punctured.
Figure 15:
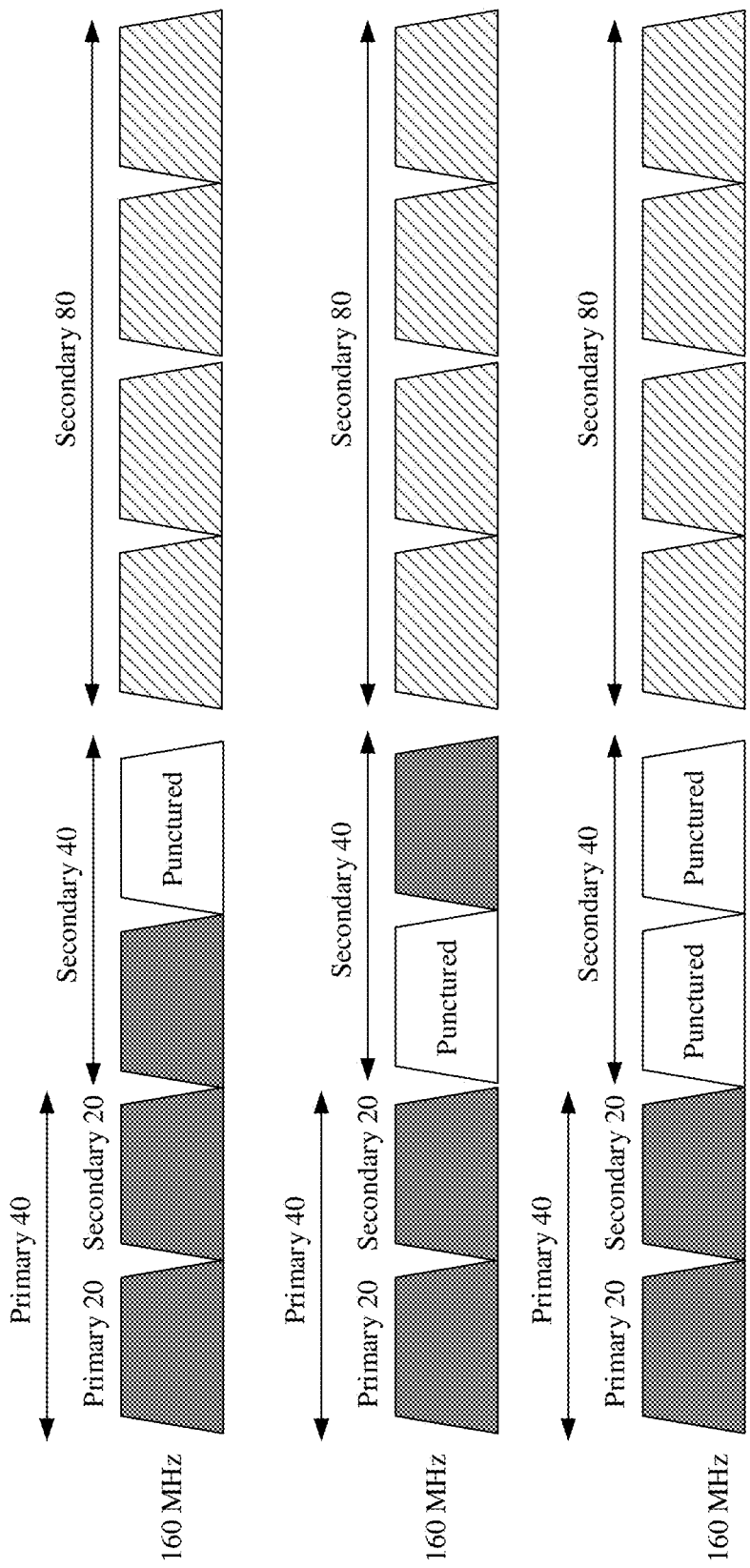
FIG. 15 shows a 160 MHz/80+80 MHz PP mode in which for primary 80 MHZ, primary 40 MHz exists, and for S80, any combination may be used.

As mentioned above, an unavailable channel exists, and a channel puncturing method is proposed in 802.11ax. In addition to four basic bandwidth modes, four preamble puncturing modes are further introduced into the HE MU PPDU in 802.11, and the preamble part presents a discontinuous state. The four non-puncturing modes (basic modes) and the four puncturing modes are all indicated by using a bandwidth field in the HE-SIG-A. The bandwidth field has 3 bits in total, and indicates eight modes in total. The first four modes are the non-puncturing modes and the last four modes are the puncturing modes. A signaling indication and corresponding channel allocation of the bandwidth field are shown in the following:

0: 20 MHz;
1: 40 MHZ;
2: an 80 MHz non-preamble puncturing (NPP) mode;
3: a 160 MHz or 80+80 MHz NPP mode;
4: an 80 MHz preamble puncturing (PP) mode in which only a secondary 20 M channel (Secondary 20) is punctured, as shown in FIG. 12;
5: an 80 MHz PP mode in which only one of two 20 MHz in S40 is punctured, as shown in FIG. 13;
6: a 160 MHz/80+80 MHz PP mode in which for a preamble of primary 80 MHZ, only S20 is punctured, and for S80, any combination may be used, as shown in FIG. 14, where a dotted line indicates puncturing or non-puncturing; and
7: a 160 MHz/80+80 MHz PP mode in which for primary 80 MHz, primary 40 MHz exists, and for S80, any combination may be used, as shown in FIG. 15.

Figure 16:
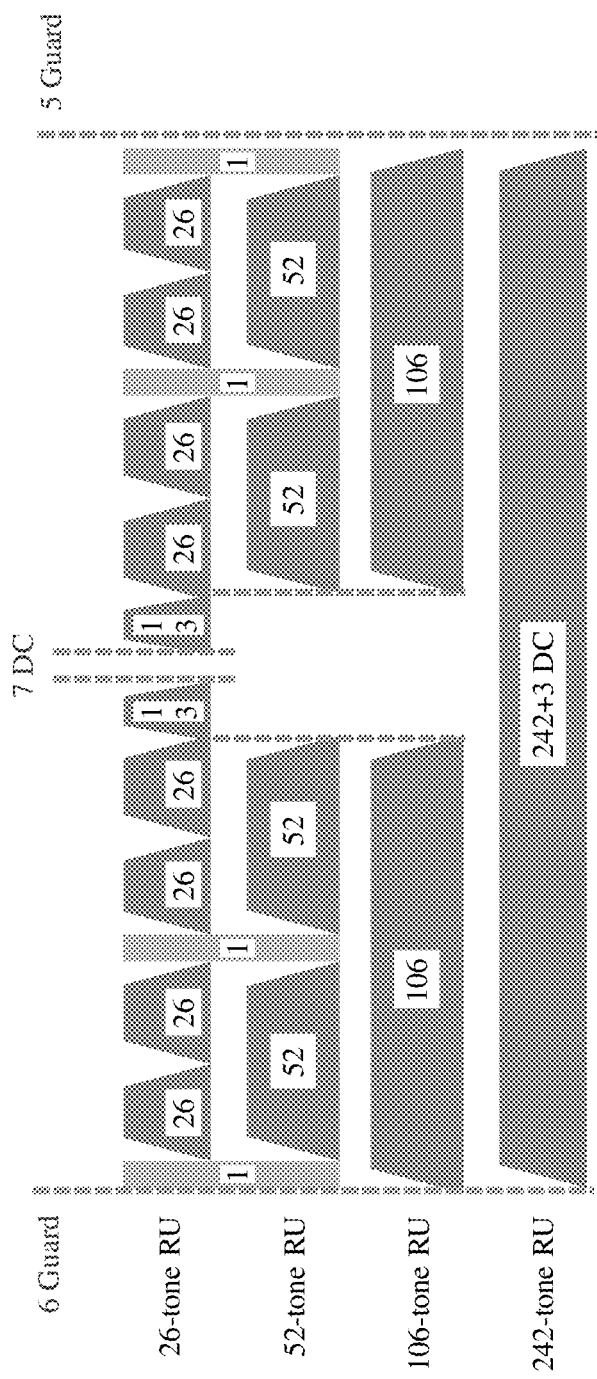
FIG. 16 shows tone plan and RU distribution of a 20 MHz channel.

(IV) Tone Plan:

Tone plan and RU distribution of a 20 MHz channel are shown in FIG. 16. When a bandwidth is 20 MHz, the entire bandwidth may include an entire 242-tone RU, or may include various combinations of a 26-tone RU, a 52-tone RU, and a 106-tone RU. In addition to the RU used to transmit data, some guard tones, null tones (yellow parts in the figure), or direct current (DC) tones are further included.

Figure 17:
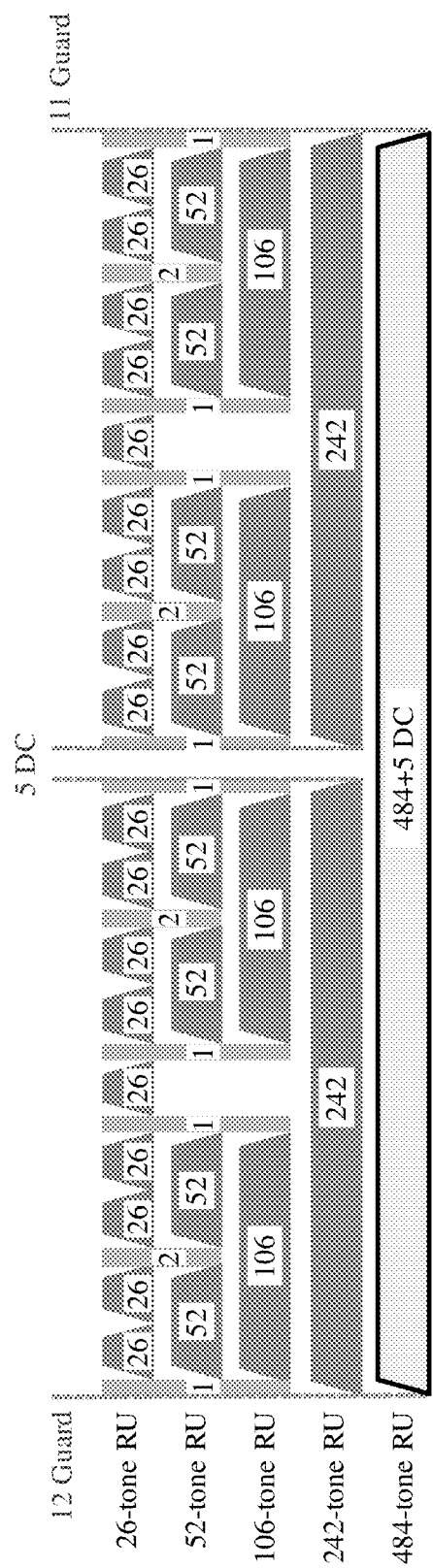
FIG. 17 shows tone plan and RU distribution of a 40 MHz channel.

Tone plan and RU distribution of a 40 MHz channel are shown in FIG. 17. When a bandwidth is 40 MHz, the entire bandwidth is approximately equal to replication of tone plan of the 20 MHz channel. The entire bandwidth may include an entire 484-tone RU, or may include various combinations of a 26-tone RU, a 52-tone RU, a 106-tone RU, and a 242-tone RU.

Figure 18:
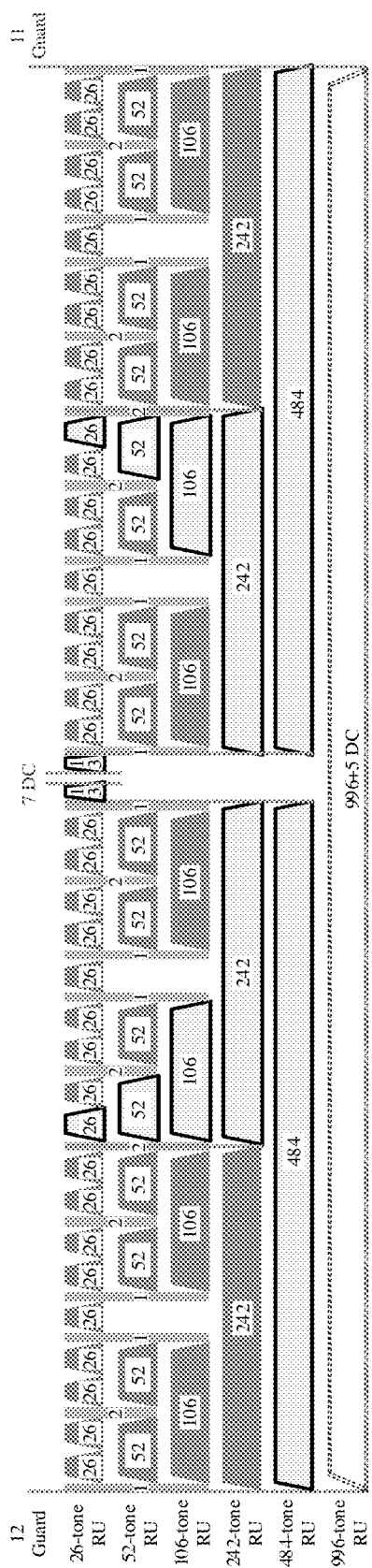
FIG. 18 shows tone plan and RU distribution of an 80 MHz channel.

Tone plan and RU distribution of an 80 MHz channel are shown in FIG. 18. When a bandwidth is 80 MHz, the entire bandwidth includes four resource units in units of 242-tone RU. Specially, a center 26-tone RU including two 13-tone subunits further exists in the middle of the entire bandwidth. The entire bandwidth may include an entire 996-tone RU, or may include various combinations of a 26-tone RU, a 52-tone RU, a 106-tone RU, a 242-tone RU, and a 484-tone RU.

When a bandwidth is 160 MHz or 80+80 MHz, the entire bandwidth may be considered as replication of tone plan of two 80 MHz. The entire bandwidth may include an entire 2*996-tone RU, or may include various combinations of a 26-tone RU, a 52-tone RU, a 106-tone RU, a 242-tone RU, a 484-tone RU, and a 996-tone RU. Due to space limitation, a figure is not separately drawn.

All the foregoing tone plan is in units of 242-tone RU. A left side of the figure may be considered as a lowest frequency, and a right side of the figure may be considered as a highest frequency. From left to right, 242-tone RUs may be numbered: the $1^{st}$, $2^{nd}$, ..., and $8^{th}$. It should be noted that in a data field, eight 242-tone RUs and eight 20 MHz channels are in a one-to-one correspondence in ascending order of frequencies, but do not completely overlap in terms of frequency due to existence of the center 26-tone RU.

(V) Resource Allocation and Indication

Figure 19:
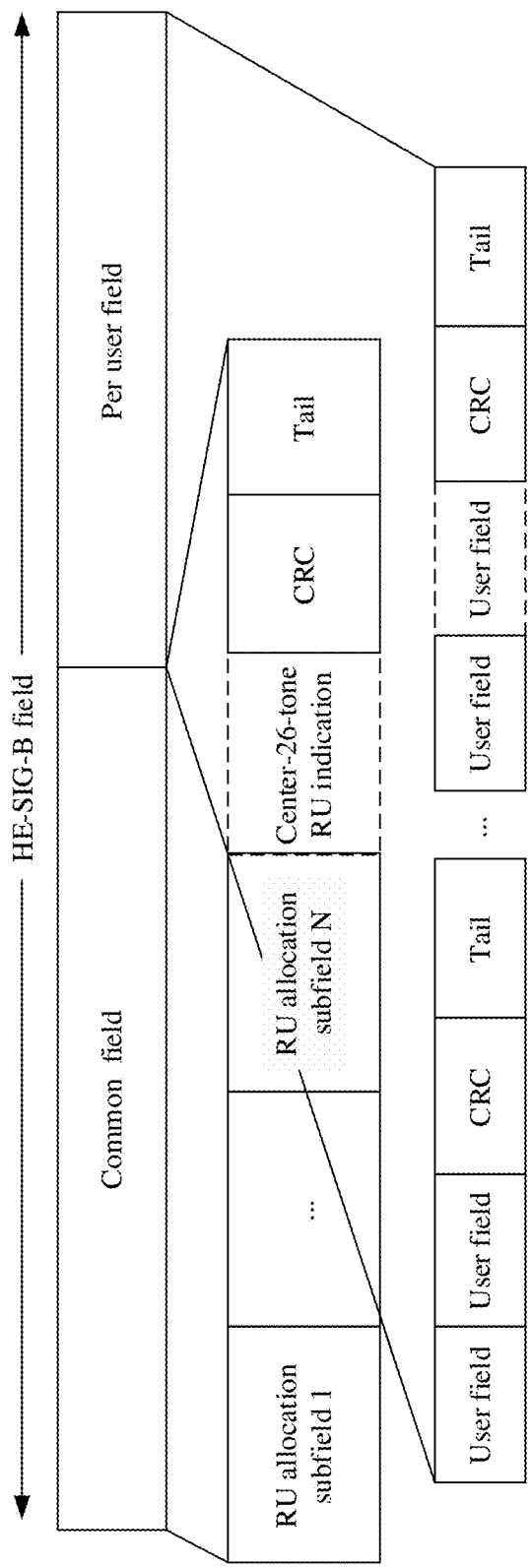
FIG. 19 shows an information structure of an HE-SIG-B on each 20 MHz.

A transmit end sends a data packet, and the data packet includes an HE-SIG-A. The HE-SIG-A indicates a symbol length of an HE-SIG-B, an MCS of the HE-SIG-B, a bandwidth of the entire data packet, and the like. If the bandwidth of the data packet is greater than 20 MHZ, the HE-SIG-A is replicated and transmitted on each 20 MHz. The data packet further includes the HE-SIG-B that provides resource indication information for DL MU MIMO and DL OFDMA. First, the HE-SIG-B is separately coded on each 20 MHz. An information structure of the HE-SIG-B on each 20 MHz is shown in FIG. 19.

As described above, the entire HE-SIG-B is divided into two parts. A first part is the common field, including a resource unit allocation subfield (RU allocation subfield) 1 to a resource unit allocation subfield N, and a center 26-tone resource unit indication field that exists when the bandwidth is greater than or equal to 80 MHz, which is followed by a cyclic redundancy code (CRC) used for check and a tail subfield used for cyclic decoding. In addition, in the per user field, there are a station field 1 to a station field M in a resource unit allocation sequence. Two of the M station fields usually form one group, and each two station fields is followed by a CRC and a tail field, except the last group in which one or two station fields may exist.

A concept of a content channel (CC) is introduced into 802.11ax. When the bandwidth of the data packet is only 20 MHz, the HE-SIG-B includes only one content channel, and the content channel includes one resource unit allocation subfield used to indicate a resource unit allocation in a 242-tone RU range in a data part. The resource unit allocation subfield has 8 bits, and indicates all possible resource unit arrangement and combination manners on a 242-tone RU by using an index. In addition, for an RU whose size is greater than or equal to 106 tones, a quantity of users who perform SU/MU-MIMO transmission on the RU is indicated by using an index. An index table of a subunit of a resource unit is as follows:

TABLE 2

Subunit of a resource unit

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |
| 00001011 | 52 | 26 | 26 | 26 | 52 | 52 | | | | 1 |
| 00001100 | 52 | 52 | 26 | 26 | 26 | 26 | 26 | | | 1 |
| 00001101 | 52 | 52 | 26 | 26 | 26 | 52 | | | | 1 |
| 00001110 | 52 | 52 | 26 | 52 | 26 | 26 | | | | 1 |
| 00001111 | 52 | 52 | 26 | 52 | 52 | | | | | 1 |
| 00010$y_2y_1y_0$ | 52 | 52 | — | 106 | | | | | | 8 |
| 00011$y_2y_1y_0$ | 106 | — | 52 | 52 | | | | | | 8 |
| 00100$y_2y_1y_0$ | 26 | 26 | 26 | 26 | 26 | 106 | | | | 8 |
| 00101$y_2y_1y_0$ | 26 | 26 | 52 | 26 | 106 | | | | | 8 |
| 00110$y_2y_1y_0$ | 52 | 26 | 26 | 26 | 106 | | | | | 8 |
| 00111$y_2y_1y_0$ | 52 | 52 | 26 | 106 | | | | | | 8 |
| 01000$y_2y_1y_0$ | 106 | 26 | 26 | 26 | 26 | 26 | | | | 8 |
| 01001$y_2y_1y_0$ | 106 | 26 | 26 | 26 | 52 | | | | | 8 |
| 01010$y_2y_1y_0$ | 106 | 26 | 52 | 26 | 26 | | | | | 8 |
| 01011$y_2y_1y_0$ | 106 | 26 | 52 | 52 | | | | | | 8 |
| 0110$y_1y_0z_1z_0$ | 106 | — | 106 | | | | | | | 16 |
| 01110000 | 52 | 52 | — | 52 | 52 | | | | | 1 |
| 01110001 | Null 242-tone resource unit 242-tone RU empty | | | | | | | | | 1 |
| 01110010 | A 484-tone RU that is on the HE-SIG-B content channel and whose resource unit allocation subfield includes zero user fields 484-tone RU with zero user fields indicated in this RU Allocation subfield of the HE-SIG-B content channel | | | | | | | | | 1 |
| 01110011 | A 996-tone RU that is on the HE-SIG-B content channel and whose resource unit allocation subfield includes zero user fields 996-tone RU with zero user fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | 26 | 106 | | | | | | | 64 |
| 11000$y_2y_1y_0$ | 242 | | | | | | | | | 8 |

TABLE 2-continued

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $11001y_2y_1y_0$ | | | | | 484 | | | | | 8 |
| $11010y_2y_1y_0$ | | | | | 996 | | | | | 8 |
| $11011y_2y_1y_0$ | | | | | Reserved | | | | | 8 |
| $111x_4x_3x_2x_1x_0$ | | | | | Reserved | | | | | 32 |

The above table is explained and described below. First, the first column represents the 8-bit index, the middle columns #1 to #9 represent different resource unit arrangements and combinations, and a number in a specific grid represents a quantity of tones included in the resource unit. For example, the index $00111y_2y_1y_0$ indicates that an entire 242-tone RU range is divided into four RUs: a 52-tone RU, a 52-tone RU, a 26-tone RU, and a 106-tone RU. In addition, the third column represents a quantity of entries indicating same resource unit allocation. A reason for existence of eight entries lies in that while indicating resource unit allocation, $y_2y_1y_0$ is further used to indicate a quantity of users included on the 106-tone RU, corresponding to a user 1 to a user 8.

In addition, if a bandwidth of a PPDU is greater than 20 MHz, the resource unit allocation subfield may further indicate a case in which a resource unit is greater than the 242-tone RU, for example, a 484-tone RU or a 996-tone RU. This indicates that a larger resource unit RU including the 242-tone RU is allocated to the STA.

Correspondingly, station information of a STA allocated in the 242-tone RU range is indicated in a resource allocation sequence in the per user field.

Figure 20:
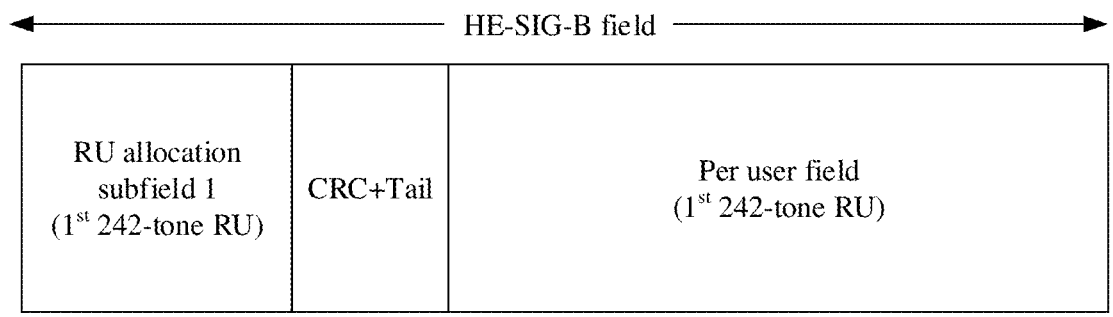
FIG. 20 shows that one HE-SIG-B content channel exists when a bandwidth of a PPDU is 20 MHz.

One HE-SIG-B content channel exists when a bandwidth of a PPDU is 20 MHz, as shown in FIG. 20.

Figure 21:
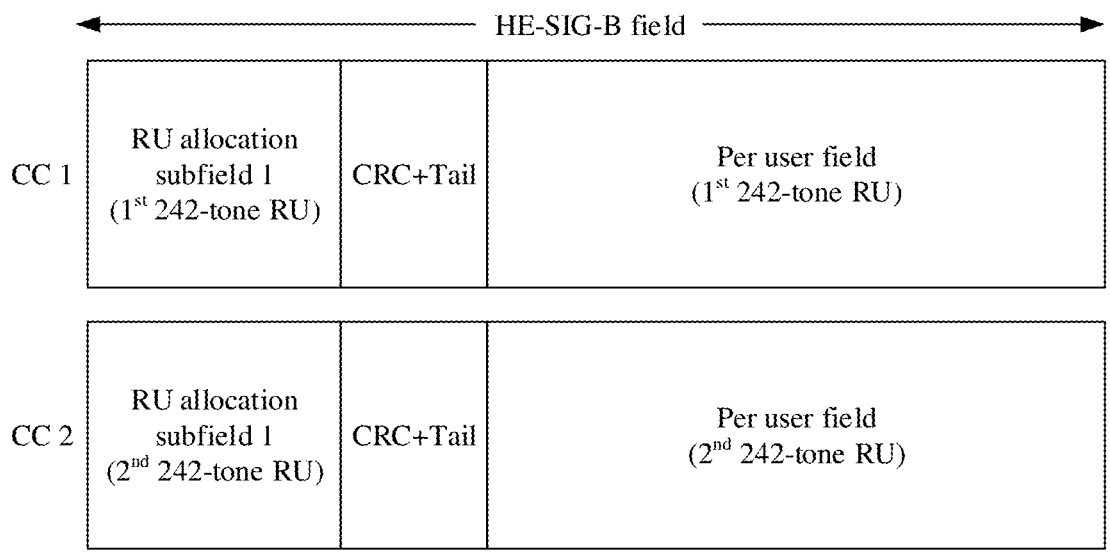
FIG. 21 shows that two HE-SIG-B content channels exist when a bandwidth of a PPDU is 40 MHz.

Two HE-SIG-B content channels exist when a bandwidth of a PPDU is 40 MHz, that is, a CC 1 and a CC 2. A CC 1 of a first HE-SIG-B channel includes a resource unit allocation subfield and a corresponding per user field in the $1^{st}$ 242-tone RU range. A CC 2 of a second HE-SIG-B channel includes a resource unit allocation subfield and a corresponding per user field in the 2nd 242-tone RU range, as shown in FIG. 21.

When a bandwidth of a PPDU is 80 MHz, two CCs still exist, and there are four channels in total. Therefore, resource unit allocation information is indicated on the four channels in ascending order of frequencies based on structures of a CC 1, a CC 2, a CC 1, and a CC 2. The CC 1 includes resource unit allocation subfields and corresponding per user fields in the 1st and 3rd 242-tone RU ranges, and the CC 2 includes resource unit allocation subfields and corresponding per user fields in the 2nd second and $4^{th}$ 242-tone RU ranges. In addition, both of the CCs carry a center-26-tone RU indication of 80 MHz to indicate whether the resource unit is used to transmit data, as shown in FIG. 22.

When a bandwidth of a PPDU is 160 MHz, expansion is further performed on the basis of 80 MHz, as shown in FIG. 23.

In addition, for MU-MIMO in a full-bandwidth mode, 802.11ax indicates, in the HE-SIG-A, that the HE-SIG-B is in a compression mode, and indicates a quantity of users who perform MU-MIMO transmission on a full bandwidth. In this case, the HE-SIG-B does not have the common field, and directly indicates the per user field.

The solutions in the embodiments of this application are described below.

Figure 2:
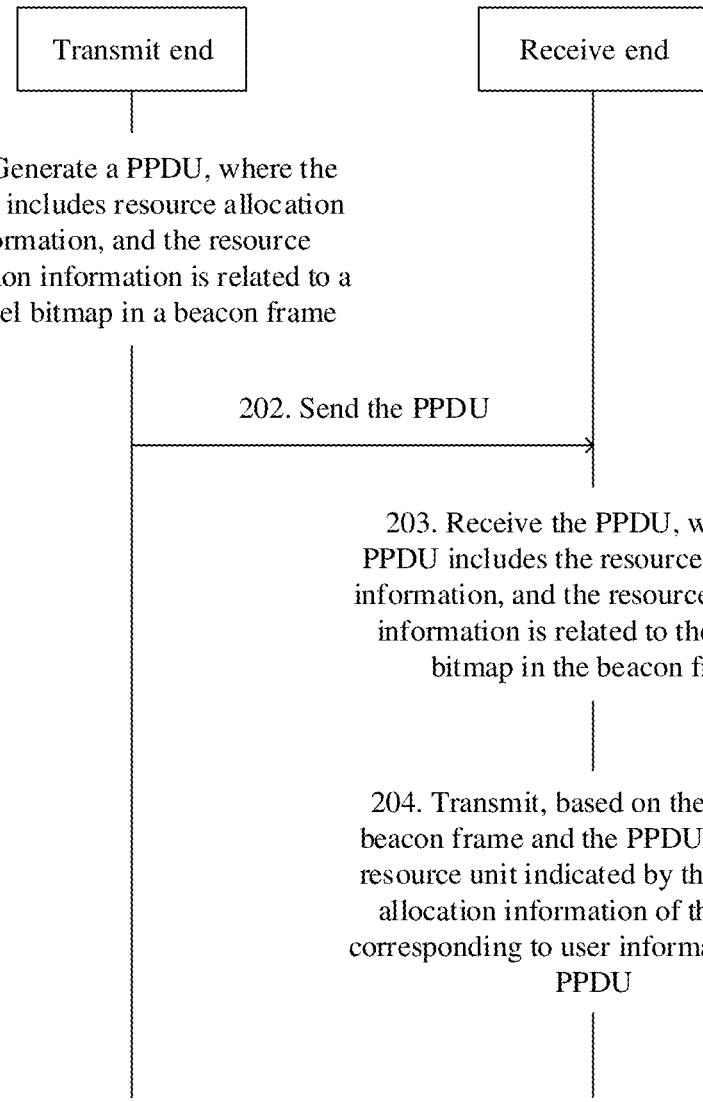
FIG. 2 is a flowchart of a resource allocation indication method according to an embodiment of this application.

Specifically, as shown in FIG. 2, a resource allocation indication method includes the following steps.

201. Generate a PPDU, where the PPDU includes resource allocation information, and the resource allocation information is related to a channel bitmap in a beacon frame.

In this embodiment of this application, the resource allocation information is generated based on the channel bitmap in the beacon frame, to generate the PPDU.

Figure 3:
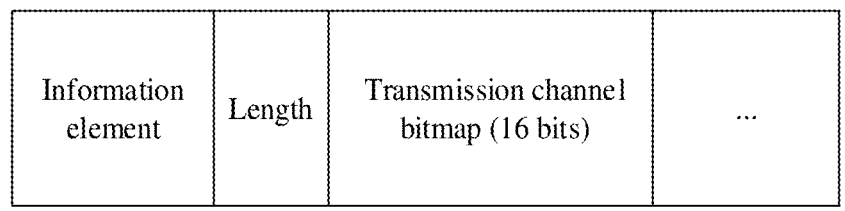
FIG. 3 shows a structure of a beacon frame.

The channel bitmap is carried in an information element in the beacon frame, as shown in FIG. 3. The information element may be an extremely high throughput (EHT) operation element, and is used to indicate an operation parameter corresponding to a basic service set in which a transmit end is located. The bitmap may be a whitelist. To be specific, a bit 1 represents that transmission can be performed on the channel, and a bit 0 represents that transmission cannot be performed on the channel. Alternatively, the bitmap may be a blacklist. To be specific, a bit 0 represents that transmission can be performed on the channel, and a bit 1 represents that transmission cannot be performed on the channel. EHT is a code number of a next-generation standard 11be of 11ax, and is similar to code numbers such as HT, VHT, and HE.

In addition to be indicated by the bitmap, whether a channel is available may be further implicitly indicated in other manners, such as an operation type and a country code. For example, in a country A, if specific several 20 MHz channels are fixedly unavailable, the several 20 MHz channels do not need to be separately indicated.

The PPDU includes the resource allocation information and user information corresponding to the resource allocation information. In an embodiment, the PPDU includes an EHT-SIG-B field, and the EHT-SIG-B field includes a common part field and a user information field (or referred to as a per user field). The resource allocation information is located in the common part field, and the user information corresponding to the resource allocation information is located in the user information field (or referred to as the per user field). The EHT-SIG-B field is transmitted on each 20 M channel. Each 20 M channel is a content channel. There are two content channels in a WLAN, which are respectively a content channel 1 (CC 1) and a content channel 2 (CC 2). The CC 1 includes resource allocation information of a 20 M channel whose ranking is an odd number and user information corresponding to the resource allocation information, and the CC 2 includes resource allocation information of a 20 M channel whose ranking is an even number and user information corresponding to the resource allocation information. For example, a 320 M channel includes sixteen 20 M channels, the CC 1 includes resource allocation information of the $1^{st}$, $3^{rd}$, $5^{th}$, $7^{th}$, $9^{th}$, $11^{th}$, $13^{th}$, and $15^{th}$ 20 M channels and user information corresponding to the resource allocation information, and the CC 2 includes resource allocation information of the 2nd, 4$^{th}$, 6$^{th}$, 8$^{th}$, 10$^{th}$, 12$^{th}$, 14$^{th}$, and 16$^{th}$ 20 M channels and user information corresponding to the resource allocation information, as shown in FIG. 4.

In a first embodiment, resource allocation information of an unavailable channel indicated by the channel bitmap in the beacon frame needs to indicate any one of the following: a null 242-tone resource unit, a 484-tone RU that is on an EHT-SIG-B content channel and whose resource unit allocation subfield includes zero user fields, or a 996-tone RU that is on the EHT-SIG-B content channel and whose resource unit allocation subfield includes zero user fields. Optionally, 01110001 is used to indicate "the null 242-tone resource unit", 01110010 is used to indicate "the 484-tone RU that is on the EHT-SIG-B content channel and whose resource unit allocation subfield includes zero user fields", and 01110011 is used to indicate "the 996-tone RU that is on the EHT-SIG-B content channel and whose resource unit allocation subfield includes zero user fields". In other words, the resource allocation information of the unavailable channel indicated by the channel bitmap in the beacon frame is any one of 01110001, 01110010, or 01110011.

In the foregoing embodiment, user information corresponding to the resource allocation information of the unavailable channel indicated by the channel bitmap in the beacon frame does not exist. This is easy to understand. Because a channel is unavailable, resource allocation information of the unavailable channel is naturally a special value, and user information corresponding to the resource allocation information of the unavailable channel does not exist. In other words, the resource allocation information of the unavailable channel needs to be represented by a special value, and the user information corresponding to the unavailable channel does not exist.

In the foregoing embodiment, for example, as shown in FIG. 4, the 5$^{th}$, 9$^{th}$, 13$^{th}$, and 15$^{th}$ 20 M channels are unavailable. Therefore, the resource allocation information of the 5$^{th}$, 9$^{th}$, 13$^{th}$, and 15$^{th}$ 20 M channels is any one of 01110001, 01110010, or 01110011, and the user information corresponding to the resource allocation information of the 5$^{th}$, 9$^{th}$, 13$^{th}$, and 15th 20 M channels does not exist. In FIG. 4, the 1st 242-tone RU represents the 1st 20 M channel. In other words, the 1st 20 M channel may also be referred to as the 1st 242-tone RU. The RU allocation subfield includes the resource allocation information. In other words, the resource allocation information is carried in the RU allocation subfield. In this case, the RU allocation subfield for the 1st 242-tone RU represents the resource allocation information of the 1st 242-tone RU, or indicates the resource allocation information of the 1st 20 M channel.

In the first embodiment, the resource allocation information of the unavailable channel indicated by the channel bitmap in the beacon frame is a special value, to indicate that the channel is unavailable. In this embodiment of this application, an unavailable channel is indicated through an indication of the PPDU, so that a receive end can be prevent from performing transmission on the unavailable channel. This prevents interference to a radar or an authorized user.

In a second embodiment, the resource allocation information of the PPDU includes only resource allocation information of an available channel indicated by the channel bitmap in the beacon frame, and does not include resource allocation information of an unavailable channel indicated by the channel bitmap in the beacon frame. For example, available channels indicated by the channel bitmap in the beacon frame include the 1$^{st}$, 3$^{rd}$, 4$^{th}$, 6$^{th}$, 7$^{th}$, 11$^{th}$, 14$^{th}$, and 16$^{th}$ 20 M channels, and unavailable channels indicated by the channel bitmap in the beacon frame include the 2nd, 5$^{th}$, 8$^{th}$, 9$^{th}$, 10$^{th}$, 12$^{th}$, 13$^{th}$, and 15$^{th}$ 20 M channels. In this case, when the PPDU is generated, the resource allocation information of the PPDU includes only resource allocation information of the 1$^{st}$, 3$^{rd}$, 4$^{th}$, 6$^{th}$, 7$^{th}$, 11$^{th}$, 14$^{th}$, and 16$^{th}$ 20 M channels, and does not include resource allocation information of the 2nd, 5$^{th}$, 8$^{th}$, 9$^{th}$, 10$^{th}$, 12$^{th}$, 13$^{th}$, and 15$^{th}$ 20 M channels. The resource allocation information of the available channels is distributed on the two content channels based on a ranking parity of the 20 M channels. For example, distribution of the resource allocation information of the 1$^{st}$, 3$^{rd}$, 4$^{th}$, 6$^{th}$, 7$^{th}$, 11$^{th}$, 14$^{th}$, and 16$^{th}$ 20 M channels is as follows: The resource allocation information of the 1$^{st}$, 3$^{rd}$, 7$^{th}$, and 11$^{th}$ 20 M channels is on the content channel 1, and the resource allocation information of the 4$^{th}$, 6$^{th}$, 14$^{th}$, and 16$^{th}$ 20 M channels is on the content channel 2, as shown in FIG. 5. The content channel 1 and the content channel 2 are respectively sent on a 20 M channel whose ranking is an odd number and a 20 M channel whose ranking is an even number; or the content channel 1 and the content channel 2 are respectively sent on a 20 M channel whose ranking is an even number and a 20 M channel whose ranking is an odd number. The content channel is described in the related technology in the embodiments of this application, and details are not described herein again.

In this embodiment, the user information corresponding to the resource allocation information of the unavailable channel indicated by the channel bitmap in the beacon frame does not exist. This point is the same as that described in the first embodiment, and details are not described herein again.

In the second embodiment, the resource allocation information of the PPDU includes only the resource allocation information of the available channel indicated by the channel bitmap in the beacon frame, and does not include the resource allocation information of the unavailable channel indicated by the channel bitmap in the beacon frame, so that overheads can be reduced on the basis of the first embodiment.

In a third embodiment, the resource allocation information of the PPDU includes only resource allocation information of an available channel indicated by the channel bitmap in the beacon frame, and does not include resource allocation information of an unavailable channel indicated by the channel bitmap in the beacon frame. Distribution of the resource allocation information of the PPDU is as follows: Available channels indicated by the channel bitmap in the beacon frame are re-ranked, resource allocation information of an odd-numbered channel after re-ranking is on the content channel 1, and resource allocation information of an even-numbered channel after re-ranking is on the content channel 2. Alternatively, resource allocation information of an odd-numbered channel after re-ranking is on the content channel 2, and resource allocation information of an odd-numbered channel after re-ranking is on the content channel 1. For example, the available channels indicated by the channel bitmap in the beacon frame include the 1$^{st}$, 3$^{rd}$, 4$^{th}$, 6$^{th}$, 7$^{th}$, 11$^{th}$, 14$^{th}$, and 16$^{th}$ 20 M channels. The 1$^{st}$, 3$^{rd}$, 4$^{th}$, 6$^{th}$, 7$^{th}$, 11$^{th}$, 14$^{th}$, and 16$^{th}$ 20 M channels are re-ranked, and re-ranked channel are the 1$^{st}$, 2$^{nd}$, 3$^{rd}$, 4$^{th}$, 5$^{th}$, 6$^{th}$, 7$^{th}$, and 8$^{th}$ 20 M channels. Resource allocation information of an odd-numbered channel after re-ranking is on the content channel 1, and resource allocation information of an even-numbered channel after re-ranking is on the content channel 2. To be specific, resource allocation information of the 1$^{st}$, 4$^{th}$, 7$^{th}$, and 14$^{th}$ 20 M channels indicated by the channel bitmap in the beacon frame is on the content channel 1, and resource allocation information of the $3^{rd}$, $6^{th}$, $11^{th}$, and $16^{th}$ 20 M channels indicated by the channel bitmap in the beacon frame is on the content channel 2. The available channels indicated by the channel bitmap in the beacon frame are re-ranked, as shown in the following table.

| Channel number before ranking | Channel number after ranking | Content channel |
|---|---|---|
| 1 | 1 | CC 1 |
| 3 | 2 | CC 2 |
| 4 | 3 | CC 1 |
| 6 | 4 | CC 2 |
| 7 | 5 | CC 1 |
| 11 | 6 | CC 2 |
| 14 | 7 | CC 1 |
| 16 | 8 | CC 2 |

In this embodiment, the resource allocation information included in the PPDU and distribution of the resource allocation information are shown in FIG. 6, the resource allocation information of the $1^{st}$, $4^{th}$, $7^{th}$, and $14^{th}$ 20 M channels indicated by the channel bitmap in the beacon frame is on the content channel 1, and the resource allocation information of the $3^{rd}$, $6^{th}$, $11^{th}$, and $16^{th}$ 20 M channels indicated by the channel bitmap in the beacon frame is on the content channel 2. The content channel is described in the related technology in the embodiments of this application, and details are not described herein again.

In this embodiment, the user information corresponding to the resource allocation information corresponding to the unavailable channel indicated by the channel bitmap in the beacon frame does not exist. This point is the same as that described in the first embodiment, and details are not described herein again.

In the foregoing example, a quantity of available channels is exactly 8, and an equivalent channel after re-ranking is equal to 160 MHz. When a quantity of unavailable channels is some imperfect numbers, for example, 9 (that is, a quantity of available channels is 7), there are the following two processing manners.

Opt1: It is required that a bandwidth after re-ranking shall be one of 20 MHz, 40 MHz, 80 MHz, or 160 MHz supported by 802.11. In this case, re-ranking may be first performed based on eight available channels. Further, a signaling field (an EHT-SIG-A/B) is used to indicate that a channel in re-ranking is unavailable. For example, assuming that the $1^{st}$, $3^{rd}$, $4^{th}$, $6^{th}$, $7^{th}$, $11^{th}$, and $14^{th}$ 20 M channels are available, the $1^{st}$, $3^{rd}$, $4^{th}$, $6^{th}$, $7^{th}$, $11^{th}$, $14^{th}$, and $16^{th}$ 20 M channels are re-ranked and indicated based on that the $1^{st}$, $3^{rd}$, $4^{th}$, $6^{th}$, $7^{th}$, $11^{th}$, $14^{th}$, and $16^{th}$ 20 M channels are available. However, the $16^{th}$ 20 M channel is unavailable. Therefore, the signaling field is further used to indicate that the $16^{th}$ 20 M channel is unavailable.

Opt2: A bandwidth after re-ranking may be any value. Resource allocation information of re-ranked channels is still separately placed on a corresponding content channel according to an existing rule.

In the second embodiment, if channel puncturing is uneven, a quantity of bits transmitted on one content channel is much different from a quantity of bits transmitted on another content channel. In this case, a content channel with fewer bits needs to be filled with a bit to align with bits on another content channel. Compared with the second embodiment, in the third embodiment, the available channels are re-ranked, so that resource allocation information on the content channel 1 and the content channel 2 becomes more even, and a bit may not be filled for alignment, thereby reducing overheads. In addition, a receive end may parse the PPDU by using a smaller bandwidth.

It should be noted that the SIG-B, the EHT-SIG-B, and the HE-SIG-B are only names, and are not used to distinguish between functions and structures of the fields.

It should be noted that in this embodiment of this application, the resource allocation information of the available channel indicated by the channel bitmap in the beacon frame may be further described as the resource allocation information corresponding to the available channel indicated by the channel bitmap in the beacon frame.

202. Send the PPDU.

203. Receive the PPDU, where the PPDU includes the resource allocation information, and the resource allocation information is related to the channel bitmap in the beacon frame.

204. Transmit, based on the received beacon frame and the PPDU, data on a resource unit indicated by the resource allocation information of the PPDU corresponding to user information of the PPDU.

In step 204, in the first embodiment in step 202, the receive end can determine an available channel and resource allocation information of the available channel simply by receiving and parsing the PPDU. The receive end makes a one-to-one correspondence between the resource allocation information of the available channel and user information one-by-one, to determine a resource unit allocated to the receive end. In the second embodiment and the third embodiment in step 202, the receive end first receives and parses the beacon frame, and determines a specific available channel by using the channel bitmap in the beacon frame; then, parses the resource allocation information of the PPDU to determine resource allocation information corresponding to the available channel; and further determines, based on a one-to-one correspondence between user information and a resource unit that is indicated by the resource allocation information of the available channel, a resource unit allocated to the receive end. In other words, the receive end determines a specific available channel to which the resource unit allocated to the receive end belongs and a specific resource unit that is of the available channel and to which the resource unit allocated to the receive end belongs. That the receive end transmits data on the resource unit corresponding to the receive end includes: receiving data from a transmit end on the resource unit allocated to the receive end, or sending data to a transmit end on the resource unit allocated to the receive end.

When an unavailable channel exists, this embodiment of this application provides a method for designing resource allocation information and user information of a PPDU, to resolve how to indicate and allocate an available channel resource when an unavailable channel exists.

The resource allocation indication method in the embodiments of this application is described above. A resource allocation indication apparatus in the embodiments of this application is described below. The resource allocation indication apparatus in the embodiments of this application includes a resource allocation indication apparatus applied to a transmit end and a resource allocation indication apparatus applied to a receive end. It should be understood that the resource allocation indication apparatus applied to a transmit end is the transmit end in the foregoing method, and has any function of the transmit end in the foregoing method. The resource allocation indication apparatus applied to a receive end is the receive end in the foregoing method, and has any function of the receive end in the foregoing method.

Figure 7:
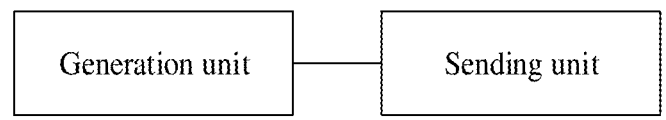
FIG. 7 shows a resource allocation indication apparatus applied to a transmit end.

As shown in FIG. 7, the resource allocation indication apparatus applied to a transmit end includes: a generation unit, configured to generate a PPDU, where the PPDU includes resource allocation information, and the resource allocation information is related to a channel bitmap in a beacon frame; and a sending unit, configured to send the PPDU.

The resource allocation indication apparatus applied to a transmit end provided in this embodiment of this application can indicate an unavailable channel through an indication of the PPDU, so that a station (STA) can be prevent from performing transmission on the unavailable channel. This prevents interference to a radar or an authorized user. The resource allocation indication apparatus applied to a transmit end provided in this embodiment of this application is the transmit end in the foregoing method, and has any function of the transmit end in the foregoing method. For specific details, refer to the foregoing method. Details are not described herein again.

Figure 8:
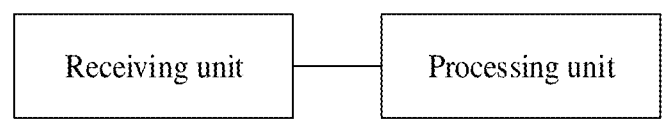
FIG. 8 shows a resource allocation indication apparatus applied to a receive end.

As shown in FIG. 8, the resource allocation indication apparatus applied to a receive end includes: a receiving unit, configured to receive a PPDU and a beacon frame; and a processing unit, configured to transmit, based on the received beacon frame and the PPDU, data on a resource unit corresponding to user information of the PPDU, where the resource unit is indicated by resource allocation information of the PPDU.

The resource allocation indication apparatus applied to a receive end provided in this embodiment of this application receives the PPDU in the foregoing method, and can determine an unavailable channel through an indication of the PPDU, so that the receive end can be prevented from performing transmission on the unavailable channel. This prevents interference to a radar or an authorized user.

Alternatively, the resource allocation indication apparatus applied to a receive end provided in this embodiment of this application receives the beacon frame and the PPDU that is in the foregoing method, and determines a specific available channel by using a channel bitmap in the beacon frame; determines, by using the resource allocation information of the PPDU, resource allocation information corresponding to the available channel; and determines, by using a one-to-one correspondence between the resource allocation information and user information of an available channel, a resource unit corresponding to the receive end, that is, determines a resource unit allocated to the receive end. In other words, the receive end determines a specific available channel to which the resource unit allocated to the receive end belongs and a resource unit that is of the available channel and to which the resource unit allocated to the receive end belongs. That the receive end transmits data on the resource unit allocated to the receive end includes: receiving data from a transmit end on the resource unit allocated to the receive end, or sending data to a transmit end on the resource unit allocated to the receive end.

The resource allocation indication apparatus applied to a receive end provided in this embodiment of this application is the receive end in the foregoing method, and has any function of the receive end in the foregoing method. For specific details, refer to the foregoing method. Details are not described herein again.

The resource allocation indication apparatus applied to a transmit end and the resource allocation indication apparatus applied to a receive end in the embodiments of this application are described above. Possible product forms of the resource allocation indication apparatus applied to a transmit end and the resource allocation indication apparatus applied to a receive end are described below. It should be understood that any form of product that has a feature of the resource allocation indication apparatus applied to a transmit end described in FIG. 7 and any form of product that has a feature of the resource allocation indication apparatus applied to a receive end described in FIG. 8 fall within the protection scope of the embodiments of this application. It should also be understood that the following description is merely an example, and constitutes no limitation on a product form of the resource allocation indication apparatus applied to a transmit end and a product form of the resource allocation indication apparatus applied to a receive end in the embodiments of this application.

In a possible product form, the resource allocation indication apparatus applied to a transmit end and the resource allocation indication apparatus applied to a receive end in the embodiments of this application may be implemented by a general bus architecture.

The resource allocation indication apparatus applied to a transmit end includes a processor and a transceiver that is in a communicative connection with an inner side of the processor. The processor is configured to generate a PPDU, where the PPDU includes resource allocation information, and the resource allocation information is related to a channel bitmap in a beacon frame. The transceiver is configured to send the PPDU. Optionally, the resource allocation indication apparatus applied to a transmit end may further include a memory, and the memory is configured to store instructions executed by the processor.

The resource allocation indication apparatus applied to a receive end includes a processor and a transceiver that is in a communicative connection with an inner side of the processor. The transceiver is configured to receive a PPDU and a beacon frame, where the PPDU includes resource allocation information, and the resource allocation information is related to a channel bitmap in the beacon frame. The processor is configured to transmit, based on the received beacon frame and the PPDU, data on a resource unit corresponding to user information of the PPDU, where the resource unit is indicated by the resource allocation information of the PPDU. Optionally, the resource allocation indication apparatus applied to a receive end may further include a memory, and the memory is configured to store instructions executed by the processor.

In a possible product form, the resource allocation indication apparatus applied to a transmit end and the resource allocation indication apparatus applied to a receive end in the embodiments of this application may be implemented by a general-purpose processor.

A general-purpose processor that implements the resource allocation indication apparatus applied to a transmit end includes a processing circuit and an output interface that is in a communicative connection with an inner side of the processing circuit. The processing circuit is configured to generate a PPDU, where the PPDU includes resource allocation information, and the resource allocation information is related to a channel bitmap in a beacon frame. The output interface is configured to send the PPDU. Optionally, the general-purpose processor may further include a storage medium, and the storage medium is configured to store an instruction executed by the processing circuit.

A general-purpose processor that implements the resource allocation indication apparatus applied to a receive end includes a processing circuit and an input interface that is in a communicative connection with an inner side of the processing circuit. The input interface is configured to receive a PPDU and a beacon frame, where the PPDU includes resource allocation information, and the resource allocation information is related to a channel bitmap in the beacon frame. The processing circuit is configured to transmit, based on the received beacon frame and the PPDU, data on a resource unit corresponding to user information of the PPDU, where the resource unit is indicated by the resource allocation information of the PPDU. Optionally, the general-purpose processor may further include a storage medium, and the storage medium is configured to store an instruction executed by the processing circuit.

In a possible product form, the resource allocation indication apparatus applied to a transmit end and the resource allocation indication apparatus applied to a receive end in the embodiments of this application may alternatively be implemented by using the following: one or more FPGAs (field programmable gate array), a PLD (programmable logic device), a controller, a state machine, gate logic, a discrete hardware component, any other suitable circuit, or any combination of circuits that can execute various functions described throughout this application.

It should be understood that the foregoing resource allocation indication apparatuses applied to a transmit end that are in various product forms have any function of the transmit end in the foregoing method embodiment, and details are not described herein again. The foregoing resource allocation indication apparatuses applied to a receive end that are in various product forms have any function of the receive end in the foregoing method embodiment, and details are not described herein again.

Another solution in the embodiments of this application is described below.

As the description of the beacon frame described above, the channel bitmap in the beacon frame is used to indicate an available channel and an unavailable channel. However, the beacon frame is periodically sent, and therefore, an indication of the beacon frame sent based on a period is not flexible. An embodiment of this application further provides a channel indication method, to resolve a problem that an indication of a periodic beacon frame is not flexible.

When a quantity of channels that need to be punctured on a PPDU is greater than a quantity of channels indicated in a beacon frame that need to be punctured, after sending the beacon frame and before sending the PPDU, a transmit end sends a MAC frame including a bitmap or sends an NDP CMAC (Null Data Packet carrying Medium Access Control Information). The MAC frame including the bitmap indicates a newly added unavailable channel or indicates all unavailable channels, or the NDP CMAC indicates a newly added unavailable channel or all unavailable channels.

301. Generate and send a beacon frame, where the beacon frame includes a channel bitmap, and the channel bitmap is used to indicate an available channel, or the channel bitmap is used to indicate an unavailable channel.

302. Generate and send a MAC frame including a bitmap, where the MAC frame indicates a newly added unavailable channel.

In step 302, the newly added unavailable channel is described relative to the unavailable channel indicated in the beacon frame. For example, if the beacon frame indicates that the $3^{rd}$, $7^{th}$, and $8^{th}$ 20 M channels are unavailable, and the MAC frame indicates that the 2nd and $4^{th}$ 20 M channels are unavailable, total unavailable channels include the $3^{rd}$, $7^{th}$, and 8th 20 M channels and the 2nd and $4^{th}$ 20 M channels.

In step 302, all unavailable channels are the unavailable channels indicated in the beacon frame. For example, all unavailable channels indicated in the MAC frame include the $3^{rd}$, $7^{th}$, and $8^{th}$ 20 M channels and the 2nd and $4^{th}$ 20 M channels, and the $3^{rd}$, $7^{th}$, and $8^{th}$ 20 M channels are already indicated in the previous beacon frame.

303. Generate a PPDU, where the PPDU includes resource allocation information, and the resource allocation information is related to the channel bitmap in the beacon frame and the newly added unavailable channel indicated in the MAC frame.

In step 303, if the MAC frame indicates the newly added unavailable channel, the resource allocation information of the PPDU in step 303 is related to the channel bitmap in the beacon frame and the newly added unavailable channel indicated in the MAC frame. Alternatively, if the MAC frame indicates all unavailable channels, the resource allocation information of the PPDU in step 303 is related to all the unavailable channels indicated in the MAC frame.

Steps 301 to 303 are behavior of a transmit end, and the following steps 304 and 305 are behavior of a receive end.

304. Receive the beacon frame, the MAC frame indicating the newly added unavailable channel, and the PPDU, where the PPDU includes the resource allocation information, and the resource allocation information is related to the channel bitmap in the beacon frame and the newly added unavailable channel indicated in the MAC frame.

305. Transmit, based on the beacon frame, the MAC indicating the newly added unavailable channel, and the PPDU that are received, data on a resource unit indicated by the resource allocation information of the PPDU corresponding to user information of the PPDU.

It should be understood that in this embodiment, the beacon frame and the MAC frame indicating the newly added unavailable channel jointly indicate an unavailable channel. In other words, the sum of a function of the beacon frame and a function of the MAC frame indicating the newly added unavailable channel is equivalent to a function of the beacon frame in the foregoing embodiment. The transmit end generates the PPDU based on an indicated available channel or unavailable channel, which is similar to that in the foregoing embodiment, and details are not described herein again. Specifically, details of steps 303 to 305 are similar to those of steps 201 to 204 in the foregoing embodiment, and are not described herein again.

It should be understood that the MAC frame may further indicate all unavailable channels. Based on this, this embodiment may further have the following variation:

302. Generate and send a MAC frame including a bitmap, where the MAC frame indicates all unavailable channels.

303. Generate a PPDU, where the PPDU includes resource allocation information, and the resource allocation information is related to all unavailable channels indicated in the MAC frame.

304. Receive the MAC frame indicating all the unavailable channels and the PPDU.

305. Transmit, based on the MAC indicating all the unavailable channels and the PPDU that are received, data on a resource unit indicated by the resource allocation information of the PPDU corresponding to user information of the PPDU.

It should be understood that in this variation, the MAC frame indicates all the unavailable channels. In other words, a function of the MAC frame in this variation is equivalent to a function of the beacon frame in the foregoing embodiment (it should be understood that the function in this embodiment of this application is a function of indicating an available channel/unavailable channel related to the present invention). The transmit end generates the PPDU based on an indicated available channel or unavailable channel, which is similar to that in the foregoing embodiment, and details are not described herein again. Specifically, details of steps 303 to 305 are similar to those of steps 201 to 204 in the foregoing embodiment, and are not described herein again.

It should be understood that in the foregoing two variations, the MAC frame including the bitmap in steps 302 and 303 may alternatively be an NDP CMAC (Null Data Packet carrying Medium Access Control Information, null data packet carrying Medium Access Control information) including a bitmap. The NDP CMAC does not include a data part, and some short MAC information is carried in a signaling field in a preamble, to reduce overheads.

This implementation solution further provides a product corresponding to the foregoing method, and the product includes a functional unit that executes the foregoing method. This is similar to a correspondence between a product and a method in the foregoing embodiment, and details are not described herein again. In addition, the product may have a plurality of product forms. This is also similar to that a product may have a plurality of product forms mentioned in the foregoing embodiment, and details are not described herein again.

The embodiments of this application further describe several methods for implicitly indicating PPDU-related information by using a channel bitmap in a beacon frame. In a first method, the channel bitmap in the beacon frame determines a quantity of bits in a bandwidth field in a subsequently transmitted PPDU. When a quantity of punctured channels is small, the quantity of bits in the bandwidth field is 4; or when a quantity of punctured channels is large, the quantity of bits in the bandwidth field is 3. When a quantity of punctured channels is large, a quantity of bandwidth modes that can be further supported by the PPDU is small. Therefore, only a small quantity of bits is required in the bandwidth field.

In a second method, the channel bitmap in the beacon frame determines an information bandwidth of an EHT-SIG field (an EHT-SIG-A and/or an EHT-SIG-B) in the PPDU. The information bandwidth is a basic bandwidth carrying coded information. In a process of generating a target signaling field, in a possible implementation, the information bandwidth may be used as a basic information unit, and each information bandwidth is independently coded. If a bandwidth of the PPDU is greater than the information bandwidth, information is replicated and transmitted at different frequencies in units of information bandwidth. For example, when the channel bitmap in the beacon frame indicates that a punctured channel exists, the information bandwidth is 20 MHz. Alternatively, when the channel bitmap in the beacon frame indicates that no punctured channel exists, the information bandwidth is greater than 20 MHz (for example, 40 MHz or 80 MHz). A reason lies in that when a channel is punctured, some 20 MHz does not exist, the EHT-SIG-A is replicated based on 40 MHz, and a specific EHT-SIG-A cannot be transmitted.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in the embodiments disclosed in this specification, method steps and units can be implemented by electronic hardware, computer software, or a combination thereof. To clearly describe the interchangeability between the hardware and the software, the foregoing has generally described steps and composition of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in this application essentially, or the part contributing to the prior art, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
generating a physical-layer protocol data unit (PPDU), wherein the PPDU comprises resource allocation information comprised in a signal field of the PPDU, and the resource allocation information indicates resource allocations based on a channel bitmap in a beacon frame, wherein at least one punctured channel is indicated by the channel bitmap in the beacon frame, and the resource allocation information comprises a preset value that indicates a null 242-tone resource unit (RU) corresponding to the at least one punctured channel, and wherein the channel bitmap comprises a first value indicating that transmission is able to be performed on a corresponding 20 MHz channel or a second value indicating that transmission is not able to be performed on a corresponding 20 MHz channel; and
sending the PPDU and the beacon frame.

2. The method according to claim 1, wherein at least one other punctured channel indicated by the resource allocation information based on the channel bitmap in the beacon frame comprises:
a 484-tone RU that is on a signaling field-B (SIG-B) content channel and whose resource unit allocation subfield comprises zero user fields, or a 996-tone RU that is on the SIG-B content channel and whose resource unit allocation subfield comprises zero user fields.

3. The method according to claim 2, wherein the channel bitmap is carried in an Extremely High Throughput (EHT) operation element of the beacon frame.

4. The method according to claim 1, wherein the preset value is 01110001.

5. The method according to claim 1, wherein user information corresponding to the resource allocation information of the at least one punctured channel indicated by the channel bitmap in the beacon frame does not exist in the PPDU.

6. The method according to claim 1, wherein the channel bitmap indicates at least one other punctured channel, and the resource allocation information does not comprise any resource allocation information of the at least one other punctured channel indicated by the channel bitmap in the beacon frame.

7. The method according to claim 1, wherein available channels indicated by the channel bitmap in the beacon frame are ranked, resource allocation information on a content channel 1 comprises resource allocation information of an odd-numbered channel after the ranking, and resource allocation information on a content channel 2 comprises resource allocation information of an even-numbered channel after the ranking.

8. A method, comprising:
receiving a physical-layer protocol data unit (PPDU), wherein the PPDU comprises resource allocation information comprised in a signal field of the PPDU, and the resource allocation information indicates resource allocations based on a channel bitmap in a beacon frame, wherein at least one punctured channel is indicated by the channel bitmap in the beacon frame, and the resource allocation information comprises a preset value that indicates a null 242-tone resource unit (RU) corresponding to the at least one punctured channel, and wherein the channel bitmap comprises a first value indicating that transmission is able to be performed on a corresponding 20 MHz channel or a second value indicating that transmission is not able to be performed on a corresponding 20 MHz channel; and
transmitting, based on the beacon frame and the PPDU, data on an RU indicated by the resource allocation information of the PPDU corresponding to user information of the PPDU.

9. The method according to claim 8, wherein at least one other punctured channel indicated by the resource allocation information based on the channel bitmap in the beacon frame comprises:
a 484-tone RU that is on a signaling field-B (SIG-B) content channel and whose resource unit allocation subfield comprises zero user fields, or a 996-tone RU that is on the SIG-B content channel and whose resource unit allocation subfield comprises zero user fields.

10. The method according to claim 9, wherein the channel bitmap is carried in an Extremely High Throughput (EHT) operation element of the beacon frame.

11. The method according to claim 8, wherein the preset value is 01110001.

12. The method according to claim 8, wherein user information corresponding to the resource allocation information of the at least one punctured channel indicated by the channel bitmap in the beacon frame does not exist in the PPDU.

13. The method according to claim 8, wherein the channel bitmap indicates at least one other punctured channel, and the resource allocation information does not comprise any resource allocation information of the at least one other punctured channel indicated by the channel bitmap in the beacon frame.

14. The method according to claim 8, wherein available channels indicated by the channel bitmap in the beacon frame are ranked, resource allocation information on a content channel 1 comprises resource allocation information of an odd-numbered channel after the ranking, and resource allocation information on a content channel 2 comprises resource allocation information of an even-numbered channel after the ranking.

15. An apparatus, comprising:
a processor; and
a transceiver that is in a communicative connection with the processor;
wherein the processor is configured to generate a physical-layer protocol data unit (PPDU), wherein the PPDU comprises resource allocation information comprised in a signal field of the PPDU, and the resource allocation information indicates resource allocations based on a channel bitmap in a beacon frame, wherein at least one punctured channel is indicated by the channel bitmap in the beacon frame, and the resource allocation information comprises a preset value that indicates a null 242-tone resource unit (RU) corresponding to the at least one punctured channel, and wherein the channel bitmap comprises a first value indicating that transmission is able to be performed on a corresponding 20 MHz channel or a second value indicating that transmission is not able to be performed on a corresponding 20 MHz channel; and wherein the transceiver is configured to send the PPDU and the beacon frame.

16. The apparatus according to claim 15, wherein at least one other punctured channel indicated by the resource allocation information based on the channel bitmap in the beacon frame comprises:
  a 484-tone RU that is on a signaling field-B (SIG-B) content channel and whose resource unit allocation subfield comprises zero user fields, or a 996-tone RU that is on the SIG-B content channel and whose resource unit allocation subfield comprises zero user fields.

17. The apparatus according to claim 15, wherein the preset value is 01110001.

18. The apparatus according to claim 15, wherein user information corresponding to the resource allocation information of the at least one punctured channel indicated by the channel bitmap in the beacon frame does not exist in the PPDU.

19. The apparatus according to claim 15, wherein the channel bitmap indicates at least one other punctured channel, and the resource allocation information does not comprise any resource allocation information of the at least one other punctured channel indicated by the channel bitmap in the beacon frame.

20. The apparatus according to claim 15, wherein available channels indicated by the channel bitmap in the beacon frame are ranked, resource allocation information on a content channel 1 comprises resource allocation information of an odd-numbered channel after the ranking, and resource allocation information on a content channel 2 comprises resource allocation information of an even-numbered channel after the ranking.

* * * * *